US007768537B2

(12) United States Patent
Tognoni et al.

(10) Patent No.: US 7,768,537 B2
(45) Date of Patent: Aug. 3, 2010

(54) DISPLAY SYSTEM AND METHOD OF DIMINISHING UNWANTED MOVEMENT OF A DISPLAY ELEMENT

(75) Inventors: Keith I. Tognoni, Duluth, GA (US); David C. Huffman, Norcross, GA (US); James S. Parker, Cumming, GA (US)

(73) Assignee: L3 Communications Corporation, New York, NY (US)

( * ) Notice: Subject to any disclaimer, the term of this patent is extended or adjusted under 35 U.S.C. 154(b) by 1345 days.

(21) Appl. No.: 11/211,245

(22) Filed: Aug. 25, 2005

(65) Prior Publication Data

US 2005/0280662 A1 Dec. 22, 2005

Related U.S. Application Data

(62) Division of application No. 10/192,812, filed on Jul. 10, 2002, now Pat. No. 6,995,774.

(51) Int. Cl.
*G09G 5/00* (2006.01)
*G09G 5/10* (2006.01)
*H04N 5/00* (2006.01)
*G06K 9/00* (2006.01)
*G06K 9/36* (2006.01)
*G06K 9/40* (2006.01)

(52) U.S. Cl. ........................ 345/672; 345/611; 345/690; 348/607; 382/107; 382/236; 382/260; 382/275

(58) Field of Classification Search ................. 345/611, 345/672, 690; 348/607; 382/107, 236, 260–275
See application file for complete search history.

(56) References Cited

U.S. PATENT DOCUMENTS 3,786,479 A 1/1974 Brown et al.
4,458,330 A 7/1984 Imsand et al.
4,658,248 A 4/1987 Yu
5,396,582 A 3/1995 Kahkoska
5,557,297 A 9/1996 Sharp et al.
5,929,865 A 7/1999 Balz et al.
5,969,699 A 10/1999 Balram et al.
6,226,400 B1 5/2001 Doll
6,266,035 B1 7/2001 Palalau
6,989,823 B1 * 1/2006 Lasneski ..................... 345/204
2003/0090593 A1 * 5/2003 Xiong ........................ 348/620
2004/0008206 A1 1/2004 Tognoni et al.
2004/0174326 A1 9/2004 Yamamoto et al.

FOREIGN PATENT DOCUMENTS

JP 10-294883 11/1998

* cited by examiner

*Primary Examiner*—Xiao M Wu
*Assistant Examiner*—Tize Ma
(74) *Attorney, Agent, or Firm*—Gardner Groff Greenwald & Villanueva, PC

(57) ABSTRACT

A method and apparatus for diminishing display transients and jitter. The method and system disclosed utilizes prior illumination and position histories in displaying and illuminating representations, and elements comprising the representations, on the display. Recognizing repeated representations, finding their prior and current positions, and determining if the difference in position is over a threshold value, diminishes the jitter by displaying the representation in the new position if over the threshold value, or, if it is not over the threshold value, then displaying it in the prior location. The illumination of an element at an intensity, which is based on prior illuminations and/or intensities of the element, diminishes the transients by avoiding flashing or flicker of transient illuminations.

6 Claims, 13 Drawing Sheets

DISPLAY SYSTEM AND METHOD OF DIMINISHING UNWANTED MOVEMENT OF A DISPLAY ELEMENT

This application is a divisional of U.S. Non-Provisional patent application Ser. No. 10/192,812, filed Jul. 10, 2002, now U.S. Pat. No. 6,995,774 and is hereby incorporated by reference in its' entirety for all purposes.

TECHNICAL FIELD

The present invention relates generally to the display of video graphic images using discrete pixel elements, and more particularly to a display system and associated methods for conversion of analog video signals for presentation as an image composed of discrete pixel elements on a display device.

BACKGROUND OF THE INVENTION

A typical information display system forms a video image by mapping a series of positions, intensities and often color signals onto a display device. These signals can represent lines, circles, graphics, symbols or camera images. The goal of any such device is to present the information ergonomically. Perceptible artifacts such as smearing, flashing, flickering, jittering, wiggling, non-linearity and positional inaccuracy all detract from the quality of the display. The input signals to a display device are often analog electrical signals and these signals are subject to noise, drift, and other imperfections.

The most prevalent display device is the Cathode Ray Tube (CRT) and typical display systems are designed to be able to utilize CRTs. In a CRT, an electron beam is swept or moved across the display surface and the intensity is modulated to form the image. The image on a CRT does not persist indefinitely and in order maintain the image the beam must continually retrace and refresh the image. In a raster video system the position information is encoded in time and the positional accuracy is determined by the ability to synchronize the display to the image source. In a stroke video system, the position information is encoded in the amplitude of the input signals. The accuracy of a stroke video system is determined by the ability to accurately follow the amplitude signals. In both stroke and raster systems, the intensity and color of the image are often encoded in the analog amplitude of input signals.

Historically, both stroke and raster image systems were used on avionics platforms. Raster image systems were used to accept TV or camera images and stroke systems were often used for computer graphic information, because of Stroke's high resolution with low memory requirement characteristics. A single CRT was often used to display both raster and stroke input information.

Flat Panel Displays (FPD) such as Liquid Crystal Displays (LCD) have been replacing CRT displays in many applications. In particular, avionics applications have been shifting to LCDs because they use less space, weight less and are more reliable than CRTs. Often the input signals are not redesigned and updated at the same time and the FPD must accommodate the legacy input signals. A FPD typically uses a digital, discrete, pixel position addressing scheme compared to the typically smooth, analog position addressing of a CRT. The legacy signals must be converted by the FPD from their original format to a format that is useful for the new FPD.

The conversion of analog raster input signals for display on an FPD is a well-known problem. The ability to synchronize the display to the raster image source makes the pixel addressing accurate and resistant (but not immune) to noise issues. However, the same techniques cannot generally be utilized on stroke inputs. Any noise or errors on the positional inputs of stroke video can result in temporary illumination of pixels on the LCD. The temporary illuminations can cause the image to appear to be wiggling, jittering and/or flashing. This occurs because the noise typically has a random component and display inputs are trying to repeat the same image at a high rate (typically at least 50 Hz.). Each time the display input redraws the image, the position inputs are shifted randomly by the noise causing the display to appear to be changed each time the display is refreshed and redrawn.

Although stroke positional inputs can be high resolution, the ability of a CRT to display fine stroke details is typically limited by inertia of the electromagnetic field that is used to deflect and sweep CRT's electron beam. This inertia limits the accuracy of the beam's position when starting, stopping and changing directions. Thus, fine details such as characters and symbols can appear distorted from their intended appearance. Often the stroke signal generator/computer will compensate for some of these distortions in the input signal. It is not desirable for the FPD to replicate either the distortions of the CRT or signal generator.

U.S. Pat. No. 3,786,479, issued to Brown et al., describes a computer-based video display system that receives binary coded image information from a host of sources. The image information is subsequently converted into stroke, or vector, information. This vector information is then converted into raster information that is stored on a magnetic disk and later displayed on a CRT.

U.S. Pat. No. 4,458,330, issued to Imsand, et al. describes a converter that receives and stores vectors within a given region or band. The stored vectors are serially selected and converted to raster coordinates. The converter then determines if the coordinates should be output. After making this decision for all the coordinates, the output is generated.

U.S. Pat. No. 4,658,248, issued to Yu, describes a method for generating stroke characters for use in a display system. Data signals are received that identify the character type and character location. Some of the data signals are processed to identify a memory location that holds instructions on generating stroke signals for identified characters. These instructions are processed to generate stroke vectors that are subsequently connected and scaled.

U.S. Pat. No. 5,557,297, issued to Sharp et al., discloses a system for displaying calligraphic video on raster displays. This system first converts analog stroke data into a raster image. By digitizing the stroke signals' intensity to a fraction of the pixel resolution, this invented system avoids problems with high scan conversion rates and large buffers. Noise within the image is reduced by saving the first and last point on the line or by using anti-aliasing disks that limit changes in intensity to a pre-selected amount, such as 3 of the pixel intensity.

U.S. Pat. No. 5,929,865, issued to Balz et al., describes a method of sorting and converting two-dimensional graphic images raster lines. Shape data, such as a circle, defined by a two-dimensional coordinate system is received. This shape data is then decomposed into individual vectors having coordinates within the defined coordinate system based on a first criterion. The determined coordinates are later sorted by a second criterion, which is used in forming raster lines.

U.S. Pat. No. 5,396,582, issued to Kahkoska, describes a raster-to-vector conversion system. This conversion system determines if a pixel is lit. If the pixel is illuminated, this system identifies a unique vector with beginning coordinates that match the coordinates of the illuminated pixel. When the vector is identified, memory is updated and the beginning and ending coordinates of the vector are sent to the plotter.

U.S. Pat. No. 5,969,699, issued to Balram et al., describes a digital filter. This filter converts line and arc data into a raster image by repetitively matching collected data to predefined templates.

U.S. Pat. No. 6,226,400, issued to Doll, discloses defining color borders in a raster image. The patent converts a raster image into a vector image without significantly varying the image by converting the color borders of the raster image into mathematical representations.

Presently existing techniques are in general concerned with converting exactly one frame of analog data for display into a bit mapped raster formats. There is a need to reduce the effects of frame-to-frame or time varying component of the noise, which can make the image appear to flash, flicker, wiggle and/or jitter. Because the human visual system is efficient at detecting changes, processing frames independently from one another can exacerbate the effects of noise. For example many techniques attempt to anti-alias lines and vectors. This is a form of smoothing and on a single frame of data it can improve the appearance. However, if the line or vector is being drawn wider, any noise from frame to frame is spread over a larger area and the eye can more easily detect variations over time in the expanded area. Another example of making the noise worse can occur whenever a conversion algorithm chooses a starting pixel on the FPD (or in the frame buffer) that corresponds to the start of a stroke line or segment and then processing from that point. The problem here is that frame-by-frame there is no guarantee that the start pixel will be the same. The algorithm will have time varying artifacts across the entire length of the line or curve, again more easily detectable than if the change had occurred on a single pixel.

Despite the developments in the area of display systems, conventional solutions do not always effectively eliminate time varying transients when displaying an analog signal on a discrete pixel element basis, such as an LCD. In a conventional stroke conversion solution there is a need for improving the translation and accurately positioning of highly detailed features, such as symbols onto a FPD. Thus, a need still exists for a conversion system that reduces time varying noises and artifacts that can distract or misinform the user.

SUMMARY OF THE INVENTION

The present invention involves the minimization of noise and artifacts during the process of converting analog video information signals for presentation as an image composed of discrete pixel elements on a display device by taking advantage of both repetitive and other predictable aspects of the input signal. There are three primary aspects to the invention which can be can utilized separately or combined in varying ways and degrees for optimum results in a given display system.

The first two forms of the invention take advantage of the time repetitive nature of most video-input signals. Typical video signals are repeated at a rate that is faster than the human visual system can perceive. This repetition can be used to filter noise that is randomly distributed from frame to frame.

The first form of the invention is for optimization of discrete individual pixel intensity with no required knowledge from surrounding pixels. The invention is a method and apparatus for displaying a desired display representation on a display over the course of at least two refresh cycles in a manner to diminish unwanted visual flashing of the displayed pixel transients. The invention includes gradually modifying pixel element intensities defining the display representation over the course of a plurality of refresh cycles, rather than abruptly or all at once. Thus, random noise transients are reduced in intensity while over time the pixel averages its correct intensity. This aspect of the invention is the most general purpose and has applications in any video system where the information is continually refreshed, i.e. both raster and stroke.

The second form of the invention provides for better control of the display of pixel regions, such as a region that contains a character that is drawn referenced to a set coordinate. Because the larger region is drawn in reference to a set coordinate, any change in the set coordinate applies to all pixels of the larger region. If a character was being drawn and the set coordinate shifted by one pixel, then the entire character would shift or wiggle. In this form the invention is a method and apparatus for displaying a desired display representation region on a display over the course of two or more refresh cycles in a manner to diminish unwanted wiggle of the whole display representation region. The invention includes determining an initial display position for the display representation region and displaying the display representation region referenced to that position. When the display input refreshes a subsequent display position is determined for the region. The subsequent display position is compared with the first display position. If the subsequent display position differs from the first display position by less than a threshold amount, the display representation is maintained at the first display position.

A third form of the invention involves decoding of the input signals to determine the values of pixel groups or display regions, especially identifying characters or symbols from predicable patterns of the input signal. A typical stroke display generator will always draw a character such as “A” using the same sequence of small strokes, these sequences are, in general, optimized for a CRT display and not for the discrete pixel structure of an FPD. When the character or portions of the character (segments) are identifiable, a representation that is designed for the FPD can be drawn instead. For example a bit-mapped or fonted “A” could be stored in the display and output to the display in place of the input signals stroked “A”. In this form the invention is a method and apparatus for determining the information that is to be contained in a display representation region from the sequence of the display inputs, determining the pixel pattern that represents that information and determining the displayed position for displaying that pixel pattern.

In a general form the invention is a display system for eliminating unwanted visual artifacts when displaying a plurality of display representations over at least two refresh cycles. The system includes a display for displaying the display representations and a video source for generating a plurality of video signals for each refresh cycle. A video converter is coupled to the video source and the display. The video converter processes the video signal by gradually varying the intensity of the processed video signals and/or restricting display locations of the processed signals. The video converter transmits the processed signals as display elements to the display.

In view of the foregoing, it will be appreciated that a display system and method according to the present invention avoids the drawbacks of prior systems. The specific techniques and structures employed by the invention to improve over the prior systems and accomplish the advantages described herein will become apparent from the following detailed description of the embodiments of the invention and the appended drawings and claims.

DETAILED DESCRIPTION OF THE EMBODIMENTS

In describing the embodiments of the present invention, specific terminology is employed for the sake of clarity. The invention, however, is not intended to be limited to the specific terminology so selected.

Figure 1:
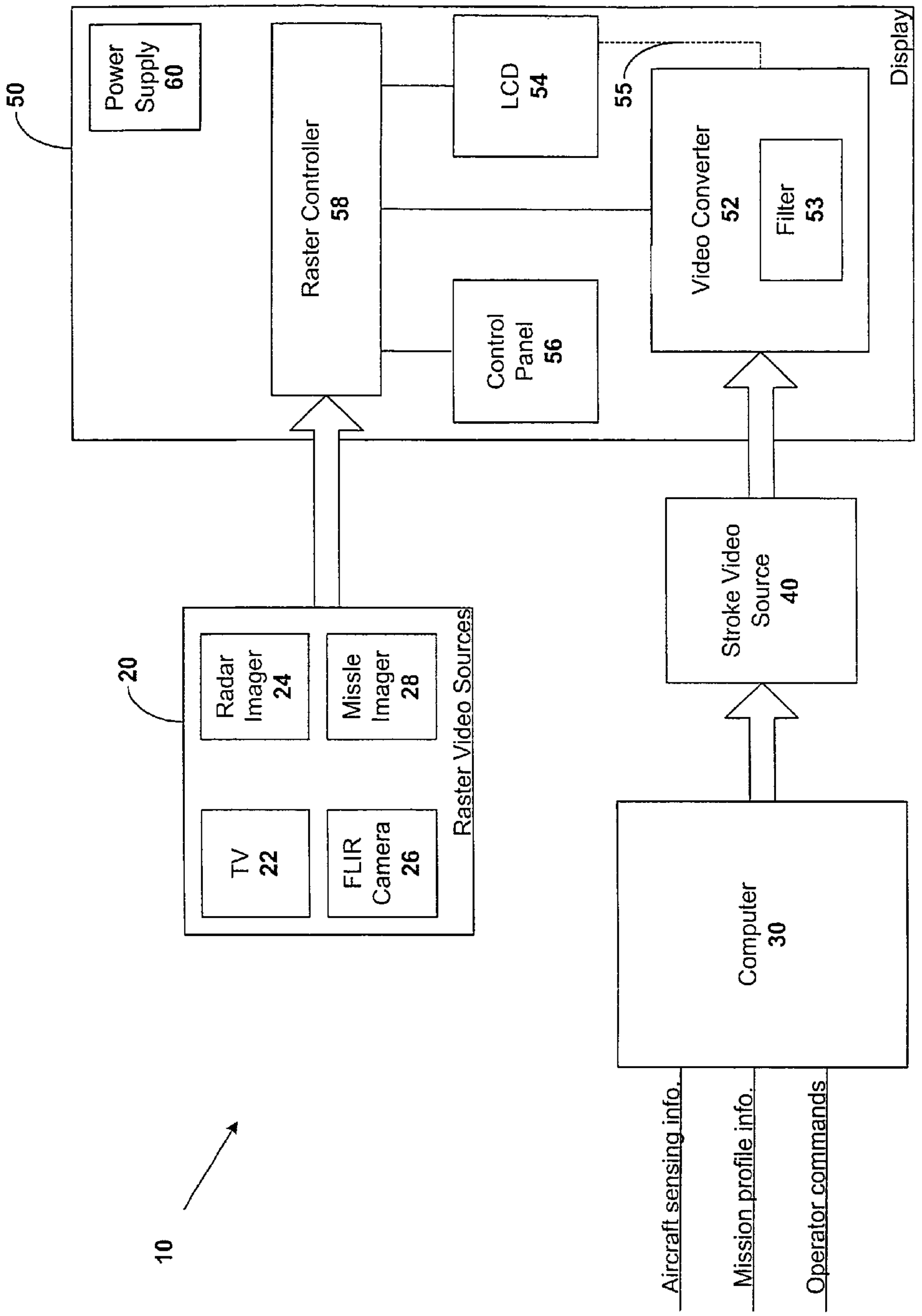
FIG. 1 is a block diagram of a video converter according to the present invention shown in conjunction with a typical environment for the same with various video sources.

FIG. 1 is a block diagram of an embodiment of the present invention of filtering in Typical Environment 10 of a system with external raster video sources. There are five main components, Raster Video Sources 20, Computer 30, Stroke Video Source 40, and Display 50.

External Raster Video Sources 20 can include Television 22, Radar Imager 24, Forward-Looking Infrared ("FLIR") Camera 26, Missile Imager 28, or some other suitable video source. Typically, these raster video sources transmit digital video signals to the Display 50 in a raster, or line by line, format. In contrast, the stroke video source 40 generates stroke, or vector, video signals that are sent to Display 50.

Generally, Computer 30 sends the data that is converted to strokes to Stroke Video Source 40. For example, Computer 30 can include several inputs that receive information regarding an aircraft. One input of Computer 30 could receive aircraft sensing information, such as wind speed, flight direction, cockpit temperature, or engine temperature. Similarly, another input can receive mission profile information, such as destination location, destination arrival time, or course plotting information. A final input of Computer 30 can receive operator commands, such as the identification of an object as a military base. Computer 30 processes and formats the information received from its inputs. In response to the inputs, Computer 30 transmits data to Stroke Video Source 40. The stroke video source forwards this data to Display 50.

Stroke Video Source 40 can be a legacy stroke generator, such as those used in some military aircrafts. Hence, Stroke Video Source 40 can generate a host of output signals, such as a tri-level brightness signal, a horizontal position signal, a vertical position signal, a horizontal symbol position signal, and a vertical symbol position signal. Stroke Video Source 40 can send these signals to Video Converter 52 within Display 50. The tri-level brightness signal can indicate if a display element, or pixel, should be illuminated. One skilled in the art will appreciate that the term pixel is a combination of PIX [picture] and Element, meaning the smallest addressable unit on a display screen. The higher the pixel resolution (the more rows and columns of pixels), the more information can be displayed. Additionally, pixels may have sub-elements. For example, in a Flat Panel Display, the color filters for red, green and blue are integrated on to the glass substrate next to each other. Each pixel (dot) is comprised of three of these color cells or sub-pixel elements. This means that with a resolution of 1280×1024 pixels, exactly 3840×1024 transistors and pixel elements exist. The dot or pixel pitch for a 15.1 inch TFT (1024×768 pixels) is about 0.0188 inch (or 0.30 mm) and for an 18.1 inch TFT (1280×1024 pixels) it is about 0.011 inch (or 0.28 mm). While in the present embodiment, a pixel is discussed, one skilled in the art will appreciate that the invention can be applied to each sub-pixel element.

In addition, this brightness signal can indicate if the other signals represent a symbol. The remaining signals can indicate either the center position of a display representation* (a graphic or symbol) or indicate the segments that form the display representation.

When Stroke Video Source 40 receives data from Computer 30, Stroke Video Source 40 converts the data into linear signals that are sent to Display 50. Stroke Video Source 40 typically transmits signals to Video Converter 52 at approximately 60 cycles/second, 100 cycles/second, or some other suitable rate.

Display 50 preferably includes Raster Controller 58, Control Panel 56, LCD 54, and Power Supply 60. Power Supply 60 powers each of the components of Display 50. While internal to Display 50 in the present embodiment, Power Supply 60 could be external to Display 50 in whole or part.

Control Panel 56, preferably allows a user to specify the information that should be displayed on LCD 54, as well as the orientation of the information. In addition, Control Panel 56 can include a power switch and inputs that allow specification of the LCD's brightness and contrast.

Raster Controller 58 receives the signals from Raster Video Source 20 and manages or controls what is sent to LCD 54. For example, Raster Controller 58 can display images from TV 22 and information received from a user via Control Panel 56, as well as mission profile information received from Computer 30.

Video Converter 52 transforms the linear video signals received from Stroke Video Source 40 into a converted stroke format recognizable by Raster Controller 58. This transformation is particularly beneficial if Computer 30 only recognizes a certain number (e.g., 512) display locations, or pixels, while LCD 54 actually has a different number of display locations (e.g. 768). This scaling difference, along with differences in gain, can make it difficult for Raster Controller 58 to receive signals directly from Stroke Video Source 40. In the absence of Raster Video Sources 20, Video Converter 52 can transmit signals directly to LCD 54 as indicated by Dashed Line 55. Video Converter 52 can include Filter 53 that limits either the pixel brightness or location where a symbol is displayed. The function of Filter 53 is described in greater detail with reference to subsequent figures.

Figure 2:
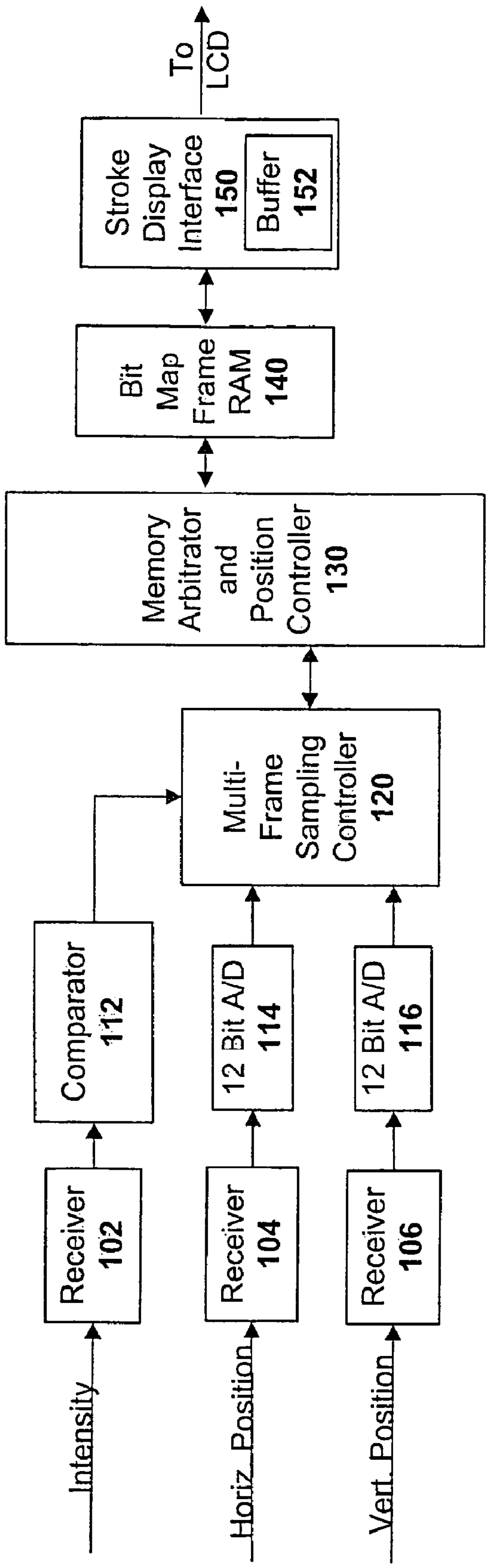
FIG. 2 is a block diagram of an alternative form of the video converter of FIG. 1.

FIG. 2 is a block diagram of First Embodiment 100 of Video Converter 52. Video Converter 52 can include three receivers, Intensity Receiver 102, Horizontal Position Receiver 104, and Vertical Position Receiver 106 that receive the stroke video signals from Stroke Video Source 40. Though not shown, Video Converter 52 can include a feedback loop that informs Stroke Video Source 40 that Video Converter 52 is busy and cannot receive signals. One skilled in the art will appreciate that alternatives to the feedback loop are capable of being used in alternative embodiments that can provide a similar function to the feedback loop, such as interrupt functions and the like. If Stroke Video Source 40 has more than three output signals, Video Converter 52 can include more than three receivers, such that the number of receivers in Video Converter 52 corresponds to the number of output signals from Stroke Video Source 40.

To improve performance, it is preferable that Receivers 102, 104, 106 have transient protection against stray voltages and have matched impedances that minimize signal reflection between Video Converter 52 and Stroke Video Source 40. In addition, these receivers can be designed for low distortion and low noise. Finally, they can operate in either a single-ended mode or a differential mode and can either include individual transistors or operational amplifiers.

Intensity Receiver 102 receives the intensity, or brightness, signal. By contrast, Horizontal Position Receiver 104 and Vertical Position Receiver 106 respectively receive the horizontal position and the vertical position signals. Initially, the signals received by Receivers 102, 104, 106 could indicate the center of a display representation to be drawn. Subsequently, the signals could represent unit segments that form the display representation. For example, the initial signals could represent the center of a rectangle formed from subsequently received unit segments.

Comparator 112 receives an output signal from Intensity Receiver 102 and detects the graphic intensity. Though not shown, Comparator 112 can also receive reference voltage that facilitates detection. Comparator 112 could be a commercially available fast comparator with a 7 ns response time. Preferably, the response time of Comparator 112 is at least twice as fast as the input signal bandwidth. After detection, Comparator 112 transmits an output signal that indicates that a pixel should be illuminated or that a symbol is being received and that the corresponding pixel should be illuminated. Thus, Comparator 112 does not send a signal when a pixel should not be illuminated.

Video Converter 52 preferably includes Horizontal Position 12-bit analog-to-digital (A/D) Converter 114 that receives an analog output signal from Horizontal Position Receiver 104. Similarly, Vertical Position 12-bit A/D converter 116 receives an analog output signal from Vertical Position Receiver 106. Each of these A/D converters can receive a signal from a clock that is driven by an oscillator. Preferably, this clock is four times as fast as the clock rate of Stroke Video Source 40. Alternatively, the oscillator clock rate could be slower, even only twice as fast as the clock rate of Stroke Video Source 40. Horizontal Position A/D Converter 114 and Vertical Position A/D Converter 116 can transmit output signals that represent the horizontal and vertical positions respectively. Generally, these output signals are in a digital format associated with display positions on LCD 54.

Multi-Frame Sampling Controller 120 receives signals from Comparator 112, Horizontal Position A/D Converter 114 and Vertical Position A/D Converter 116. Multi-Frame Sampling Controller 120 can be a field programmable gate array with algorithms that perform a variety of functions. These functions can include associating present signal positions and intensity values with previous values, calculating new intensity values and pixel locations, and transmitting signals for storage in memory. The details regarding these functions are described in more detail with reference to FIGS. 3-4.

Memory Arbitrator and Position Controller 130 receives the output signal from Multi-Frame Sampling Controller 120. Memory Arbitrator 130 determines whether Multi-Frame Sampling Controller 120 or Display Interface 150 can access Memory 140. In making this decision, Memory Arbitrator 130 may determine that Multi-Frame Sampling Controller 120 can always access Memory 56 when needed. Thus, Display Interface 54 only accesses Memory 140 when Multi-Frame Sampling Controller 120 is not using it.

For example, when a symbol was not received during the sampling cycle, Position Controller 130 increments Frame Buffer Memory 140 addresses as pixels are sent to Buffer 152 of Display Interface 152. Position Controller 130 keeps track of what the next pixel that needs to be sent to Buffer 152 of Stroke Display Interface 150. Typically, the order of pixels being sent to Buffer 152 is the same as for a raster scan while the order of pixels coming in on the Multi-Frame Sampling Controller 130 is random.

Memory 140 is connected to Memory Arbitrator 130 and could be Random Access Memory ("RAM"). Generally, selection of the types of A/D converters to use is corresponding to the size of Memory 140. That is, a 12-bit A/D converter enables effective addressing if there are 4096 horizontal memory locations within Memory 140. Typically Memory 140 has available at least one storage location for every pixel on Display 50. For example if Display 50 was 1024 rows by 768 columns then there would 768 kilopixels of memory.

The access rate of Memory 140 is preferably capable of supporting a "maximum average" sampling input rate from the Multi-Frame Sampling Controller 120 as well as being capable able of supporting the "maximum average" output data rate of Display 50. As used herein, the "maximum average" means the maximum number of memory accesses during a refresh frame. The novel memory design takes advantage of the time when the input cycle is not busy, or blanking time, to output data for the display cycle and therefore has a peak rate that is well above the average rates.

An alternative memory structure could be a dual port memory where there is independent access to the memory input and output. For this arrangement, the memory only has to be fast enough to support the higher of the input or output data rates. Generally, the capability of the A/D converter must meet or exceed the number of pixels in a row (or column) of the display. For A/D converters this specification is in general called "Effective Number of Bits (ENOB)". Thus for a display with 1024 rows the ENOB must be greater than 1024 or 10 bits/sample. The ENOB of the 12 bit A/D used in the present embodiment is 10.5 bits and in general a 12 bit A/D converter will typically have an ENOB that is less than 11 bits.

Display Interface 150 is also connected to Memory 140. Display Interface 150 can request access to Memory 140 every 60 Hz. When Display Interface 150 gets access to Memory 140, Display Interface 150 reads a section of Memory 140 and temporarily stores the values into Buffer 152. Later, the contents of Buffer 152 are sent to the LCD 52.

Buffer 152 could be any type of commercially available first in first out (FIFO) buffer. This process is described in greater detail with reference to FIG. 4.

Figure 3:
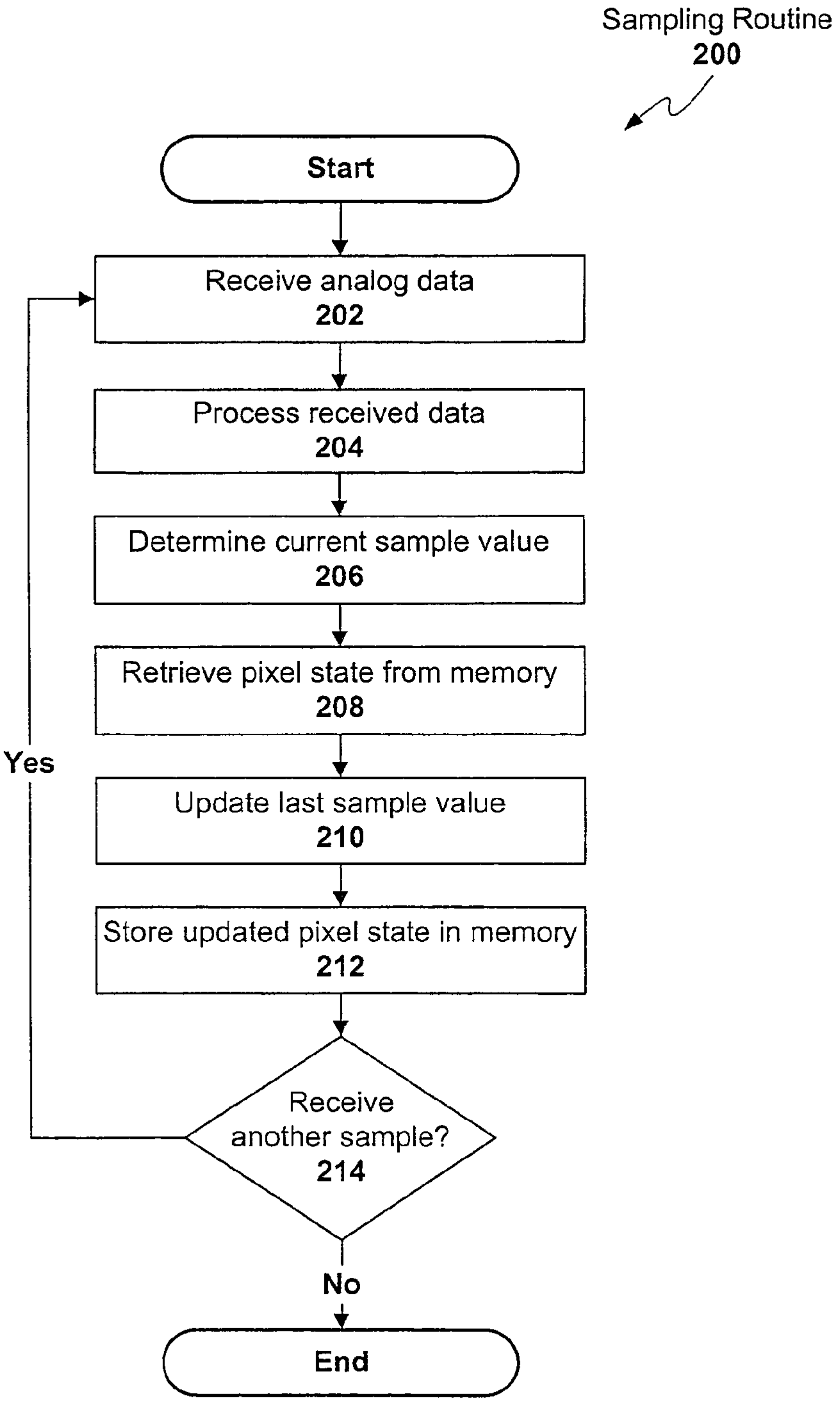
FIG. 3 is a logic flow diagram illustrating a sampling routine for the video converter of FIG. 2.

An embodiment of Sampling Routine 200 is depicted FIG. 3 as a logic flow diagram. This embodiment of Sampling Routine 200 illustrates a sampling for Video Converter 52 in which Video Converter 52 initiates a sampling cycle. Sampling Routine 200 receives analog data in Step 202. This analog data generally corresponds to the analog, or stroke, video signals sent from Stroke Video Source 40. Step 202 is followed by Step 204 in were the received data is processed. In processing this data, the stroke video signal is converted into a buffered signal that is subsequently digitized. This processing is generally accomplished using Receivers 102-106, Comparator 112, and A/D Converters 114, 116.

Step 204 is followed by Step 206, in which Sampling Routine 200 determines the current sample value. In this step, Comparator 112, which functions like a 1-bit A/D converter, determines if this pixel should be illuminated. Thus, the possible values sent from the Comparator 112 to Multi-Frame Sampling Controller 120 are either 0 or 1. Though not shown, Sampling Routine 200 returns to Step 202 from Step 206 if the current sample value is zero, which denotes that the pixel should not be illuminated.

Step 206 is followed by Step 208, in which Sampling Routine 200 retrieves the pixel state from Memory 140. The stored pixel state includes the pixel's last sample value, history of the previous sample values, and displayed intensity. The storages of the pixel value and history will be discussed subsequently in relation to FIG. 4*b*. If the current sample value is zero, Sampling Routine 200 does not retrieve the pixel state from Memory 140.

Step 208 is followed by Step 210 in which Sampling Routine 200 updates the last sample value. The calculation for this step can be either simple or complex depending upon the number of grayscale bits. For a single gray scale bit, the last sample value is updated to one because Step 208 only occurs when the current sample value is one. In other words, Sampling Routine 200 equates the last sample value with the current sample value. For more than one gray scale bit, the last sample value can become the average of the last sample value and the current sample value. Alternatively, it can become the maximum of the last sample value and the current sample value.

Step 210 is followed by Step 212 in which the Sampling Routine 200 stores updated state in memory. During this step, Sampling Routine 200 simply stores the updated last sample value, while remaining the remaining portions of the pixel state unchanged. Memory Arbitrator and Position Controller 130 supervise the memory storage process.

Step 212 is followed by Step 214 in which Sampling Routine 200 determines if it received another sample or another set of position and intensity data. This particular logic question could be housed in one of the algorithms within Multi-Frame Sampling Controller 120. If another sample was received the "Yes" branch is followed from Step 214 to Step 202 and Sampling Routine 200 is repeated. Otherwise, the "No" branch is followed from Step 214 to the end step and Sampling Routine 200 ends.

FIG. 4 is a logic flow diagram illustrating Display Routine 300 for Video Converter 52. The Display Routine 300 and Sampling Routine 200 generally run simultaneously. For Display Routine 300, two separate processes occur. The first process is Fill Buffer Process 400. The second process is Empty Buffer Process 500. In both of these processes, Buffer 152 is filled or emptied, respectively.

Figure 4A:
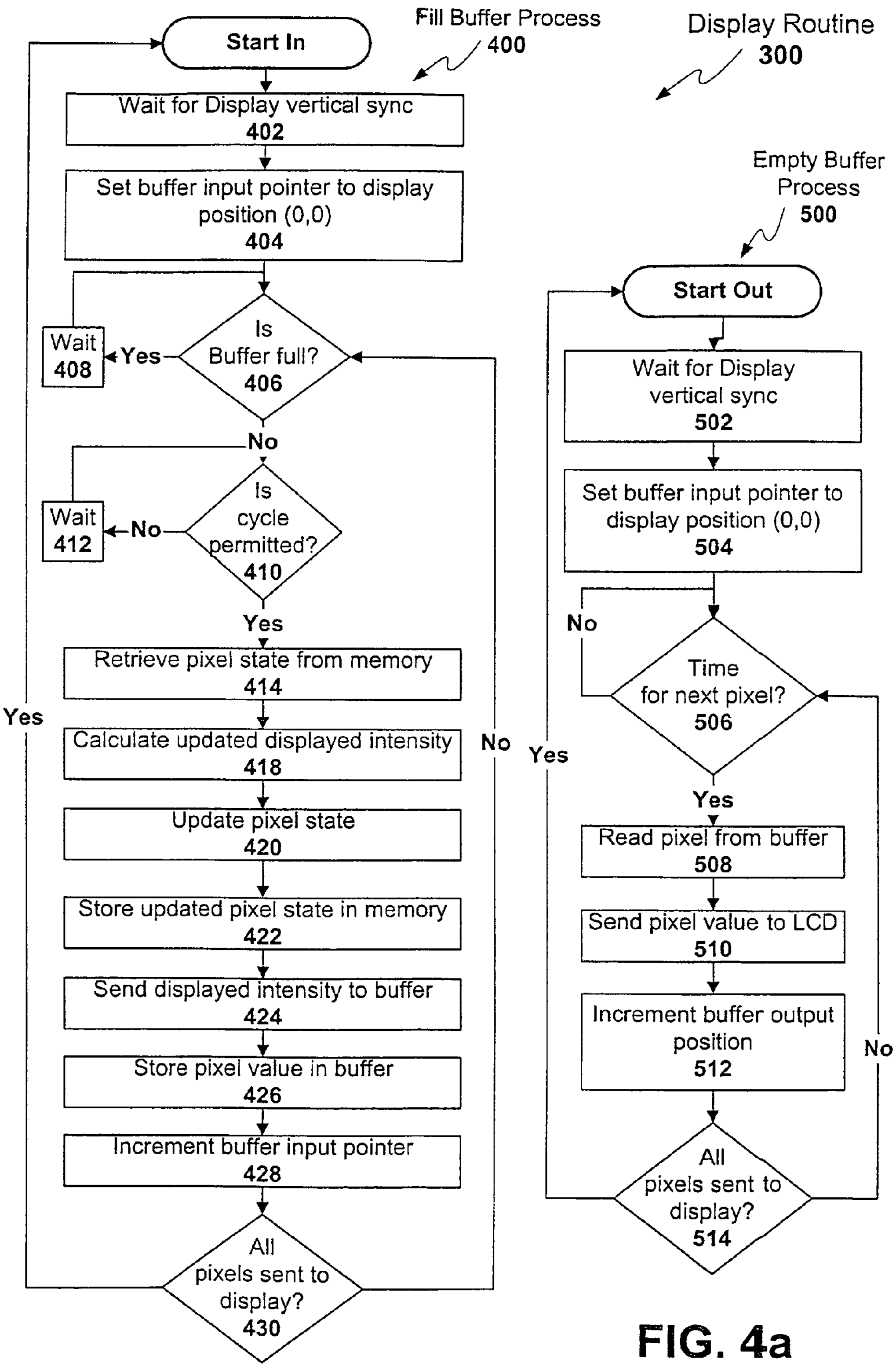
FIG. 4*a* is a logic flow diagram illustrating a display routine for the video converter of FIG. 2.

As depicted in FIG. 4*a*, Fill Buffer Process 400 is initiated with at Start In and is followed by Step 402.

In Step 402, Display Routine 300 waits for the display vertical synchronization. Display Routine 300 can receive this synchronization from either Raster Controller 58 or Display Interface 150, as previously described with reference to FIG. 1 and FIG. 2 respectively. If Display Interface 150 directly drives LCD 54, Display Interface 150 would calculate the vertical synchronization signal every 60 Hz, assuming this is the rate of LCD 54, so as to properly drive LCD 54. Alternatively, Display Interface 150 may act as a slave device that receives a vertical sync signal from the device that is driving LCD 54. For example, when Raster Controller 58 provides the vertical synchronization signal, Raster Controller 58 sends these signals to Video Converter 52, which contains a display interface.

Step 402 is followed by Step 404, in which Display Routine 300 sets the buffer pointer to the home display position (0,0). One skilled in the art will appreciate that in this step Display Interface 150 initializes the buffer's position. Other positions may be utilized to act as an initialization position.

Step 404 is followed by decision Step 406, in which Display Routine 300 determines if Buffer 152 is full. If Buffer 152 is full, the "Yes" branch is followed from Step 406 to Step 408.

In Step 408, Display Routine 300 waits a designated amount of time before polling Buffer 152 again. The wait Step 408 allows for partial emptying of the buffer before more values are added. One skilled in the art will appreciate that the wait period is based on the specifications of Buffer 152. Step 408 is followed by a repeat of Step 406 in which Display Routine 300 determines if Buffer 152 is full again. If the buffer is not full, the "No" branch is followed from Step 406 to Step 410.

In Step 410, Display Routine 300 determines if the display cycle is permitted. Generally, this determination is accomplished if Memory Arbitrator 130 allows Display Interface 150 to access Memory 140. If the cycle is not permitted, the "No" branch is followed from Step 410 to Step 412. In this step, Display Routine 300 waits a designated amount of time based on several factors including input data rates, content, display output rates, and type of memory structure. The input should be sampled often enough to drive the image above a threshold, or Nyquist, rate. In addition, the wait time should assure that the display interface Buffer 152 always has data available to send to Display 50 when needed. For improved performance, the wait time can be selected so as to decouple the input and output memory cycles as much as possible.

Step 412 is followed by a repeat Step 410 in which Display Routine 300 then determines if the cycle is permitted. If the cycle is permitted the "Yes" branch is followed and Step 410 is followed by Step 414 in which Display Routine 300 retrieves the pixel state from memory.

Step 414 is followed by Step 416 in which Display Routine 300 calculates the updated displayed intensity is calculated in a first formula of:

$$I_{t+1} = \frac{I_{max} \sum_{m-1}^{n=0} P_{t-n}}{m} \quad \text{Eq. 1}$$

where $I_{t+1}$ is the intensity to be displayed at the present refresh cycle, $P_t$ represents whether the pixel was illuminated at the preceding refresh cycle, $P_{t-1}$ represents whether the pixel was illuminated at the refresh cycle before that, $P_{t-m-1}$ represents whether the pixel was illuminated at m−1 cycles before the present the refresh cycle (if the pixel is to be illuminated, P=1; if the pixel is not to be illuminated, P=0), and $I_{max}$ represents the maximum intensity associated with a fully illuminated pixel.

Figure 4B:
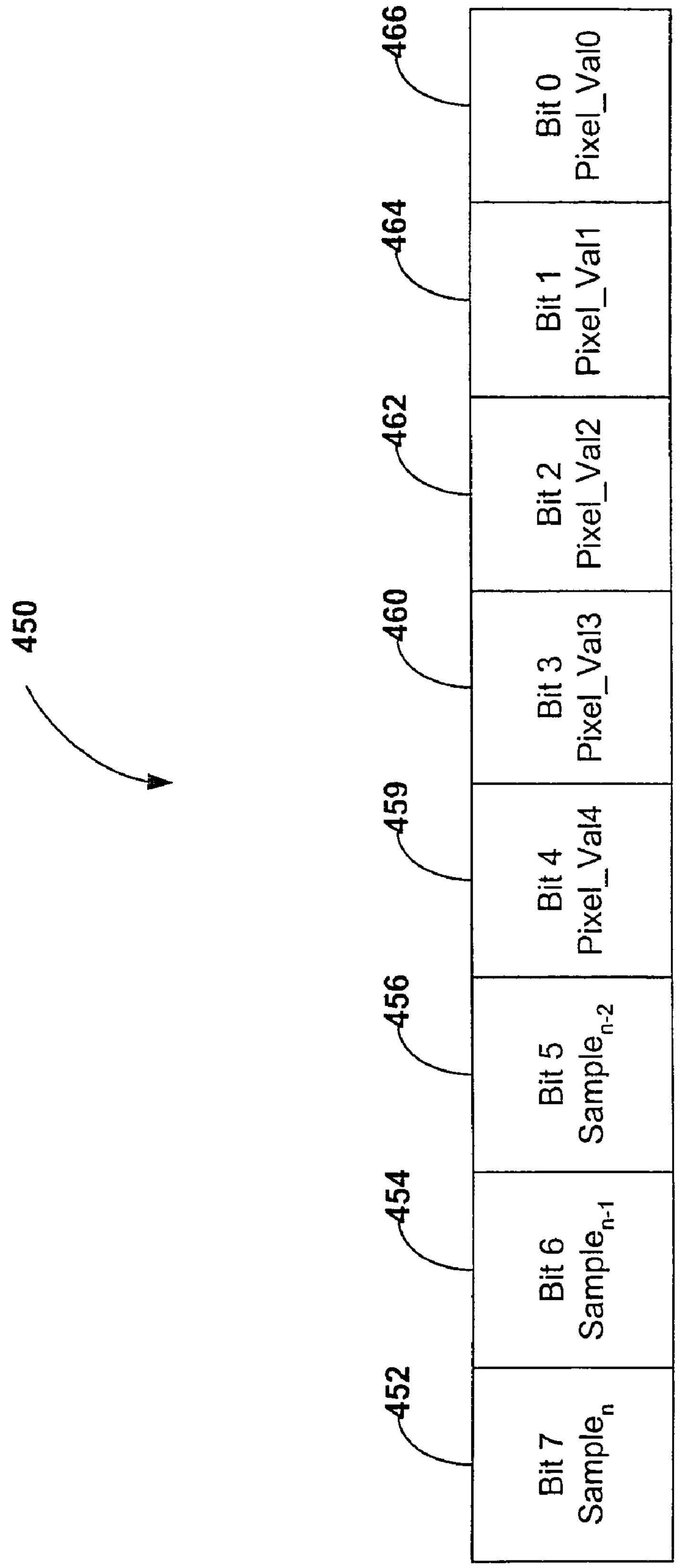
FIG. 4*b* is a depiction of an embodiment of eight-bit storage of a pixel utilized in the form as shown in FIG. 2.

As depicted in FIG. 4*b*, when utilizing Eight-Bit Device 450, which has eight bits available for each pixel, the first five pixels, Pixel_Val0 452, Pixel_Val1 454, Pixel_Val2 456, Pixel_Val3 458, and Pixel_Val4 460, might be utilized for calculation of the pixel value and the remaining three pixels $Sample_{t-2}$ 462, $Sample_{t-1}$ 464, $Sample_t$ 466, for the sampling history. In this example, m would be 3 and $I_{max}$ could be 30. Now assume that the previous pixel illuminations were be 0, 1, 1 respectively which indicates that the pixel was off in the last cycle denoted by 0 and on in the previous two cycles denoted by 1. For this example, the present illumination is calculated as $I_{t+1}=(0+1+1)(30)/3=20$.

One skilled in the art will appreciate that alternative equations might be utilized which produce future illumination based on prior pixel illuminations. These alternative equations could include logarithmic equations as well as high order linear equations, or combinations thereof.

After calculating $I_{t+1}$, Display Routine 300 uses a second formula. The updated displayed intensity $I_{disp(t+1)}$ is calculated according to the equation of:

$$I_{disp(t+1)}=(I_{(t+1)}-I_{disp(t)})R+I_{disp(t)} \quad \text{Eq. 2}$$

where $I_{disp(t+1)}$ represents the displayed intensity during the current refresh cycle, $I_{disp(t)}$ represents the displayed intensity during the previous refresh cycle and R represents a constant with values between 0 and 1 that varies the number of refresh cycles for a pixel to become fully illuminated.

For example, where R=0.25 and $I_{disp(t)}=30$ for the previous example, the new pixel value $I_{disp(t+1)}=(20-30)(0.25)+30=27.5$. Thus, Display Routine 300 reduces the intensity from 30 to 27.5 since the last illumination ($I_t=0$) suggests that the pixel should be turned off.

The acquire rate, R, controls rate, in refresh cycles, that a pixel approaches either the maximum pixel intensity $I_{max}$ or minimum pixel intensity $I_{min}$. This rate can be fixed for LCD 54 and Stroke Video Source 40. Alternatively, the acquire rate R could be user controlled. In varying this rate, a user can consider the desired quality of information being viewed and the desired speed at which the information should be seen. Of course when R is allowed to approach zero, the number of display cycles that it takes for a pixel to approach the maximum or minimum pixel intensity will approach infinity. Therefore it is preferable to set a minimum value for R, to avoid an undesirably high number of display cycles, and therefore length of time, to reach the minimum or maximum pixel value.

Generally Multi-Frame Sampling Controller 120 performs the calculations Steps 416, 418. Consequently, this functionality essentially filters the intensities of displayed pixels as described with reference to FIG. 1.

Step 418 is followed by Step 420, in which Display Routine 300 updates the pixel values. In updating the pixel values Display Routine 300 stores the present value in the same memory location where the previous value was located.

Step 420, is followed by Step 422, in which Display Routine 300 stores the updated value the memory. Generally, Multi-Frame Sampling Controller 120 completes Steps 420-422.

Step 422 is followed by Step 424 in which Display Interface 150 retrieves stored values from Memory 160.

Step 424 is followed by Step 426 in which the retrieved values are stored in Buffer 152.

Step 426 is followed by Step 428 in which the input position of Buffer 152 is incremented.

Step 428 is followed by the decision Step 430 in which Display Routine 300 determines if all pixels were sent to Display 50. If all pixels were sent, the "Yes" branch is followed from Step 430 to the "Start In" step and the filling process is reset. Otherwise, the "No" branch is followed from Step 430 to Step 406 and Display Routine 300 can continue filling Buffer 152.

To empty Buffer 152, Display Routine 300 follows its second process, Empty Buffer Process 500, as depicted in FIG. 4 that begins at "Start Out". The "Start Out" step is followed by Step 502 in which Display Routine 300 waits for the vertical synchronization.

Step 502 is followed by Step 504 in which Display Routine 300 initializes Buffer 152. Steps 502-504 behave similarly to steps 402-404. Step 504 is followed by Step 506 in which Display Routine 300 determines if the time has come for sending the next pixel. If it is not time for the next pixel, the "No" branch is followed and Step 506 is repeated. That is, Display Routine 300 does not progress until it is time for the next pixel. When it is time for the next pixel, the "yes" branch is followed from Step 506 to Step 508. In Step 508, Display Routine 300 reads the pixel from Buffer 152.

Step 508 is followed by Step 510 in which the pixel value is sent to Raster Controller 58. As previously described, Video Converter 52 can send signals directly to LCD 54 or to Raster Controller 58, which forwards them to LCD 54.

Step 510 is followed by Step 512 in which Display Routine 300 increments the buffer's output position.

Step 512 is followed by the decision Step 514. In Step 514, Display Routine 300 determines if all pixels have been sent to the display 18. If all the pixels were sent to Display 50, the "yes" branch is followed from Step 514 to the "Start Out" step, which resets the buffer emptying process. Otherwise, the "No" branch is followed from Step 514 to Step 506 and Display Interface 150 continues emptying Buffer 152.

Figure 5A:
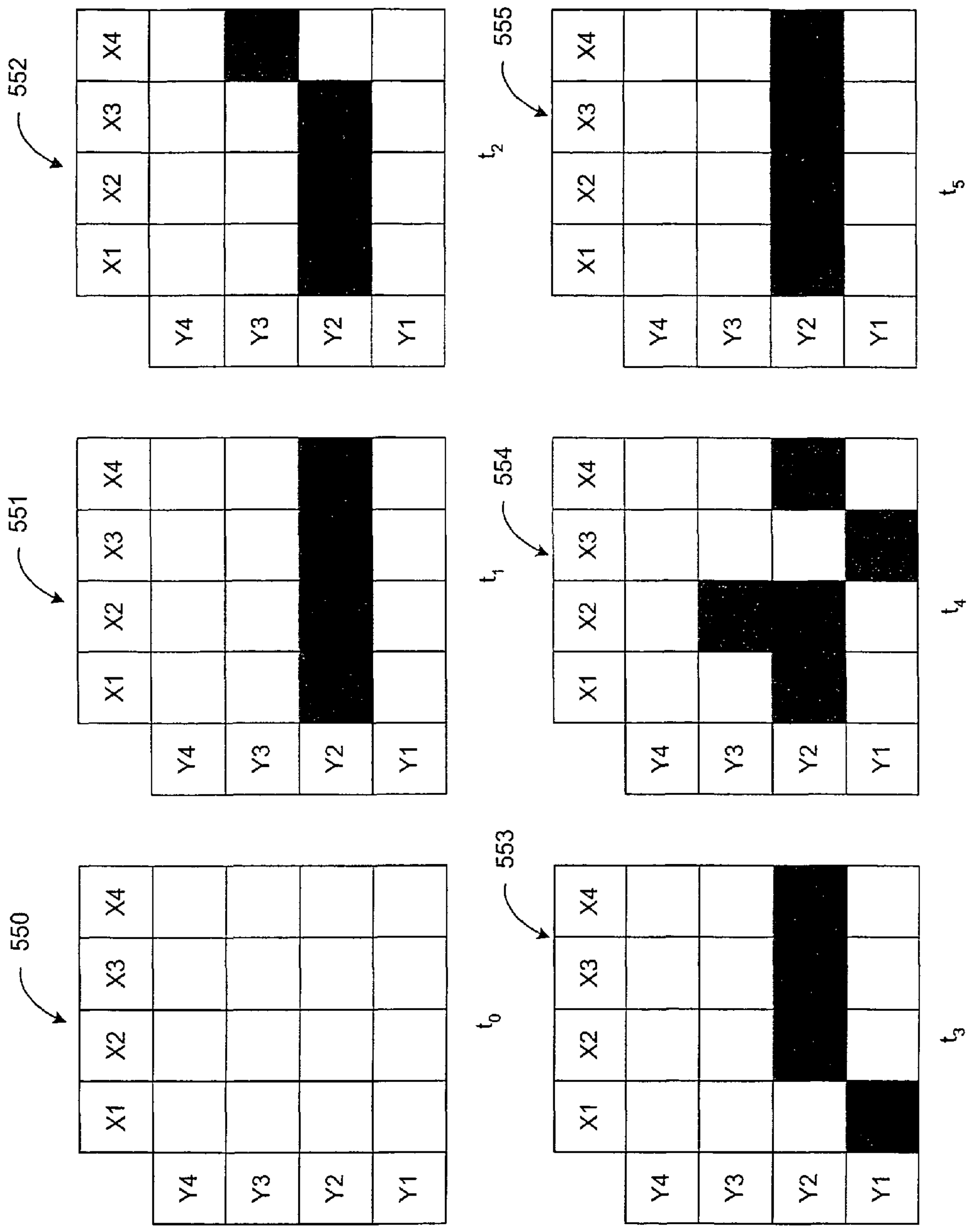
FIG. 5*a* is a sequence of schematic diagrams of the LCD panel of FIG. 1 for varying instances in time without utilizing the present invention.

FIG. 5*a* is a schematic diagram of LCD 54, depicting Display Panels 550-555, which are at varying instances of time illustrating visual changes on Display 50 without utilizing the present invention, including noise or "wiggle" typically present in such a system around the "desired" output of illumination of pixels (X1-X4, Y2) starting at time, $t_1$, through time, $t_5$. As shown, "noise" may include illumination of undesired pixels or non-illumination of desired pixels.

Figure 5B:
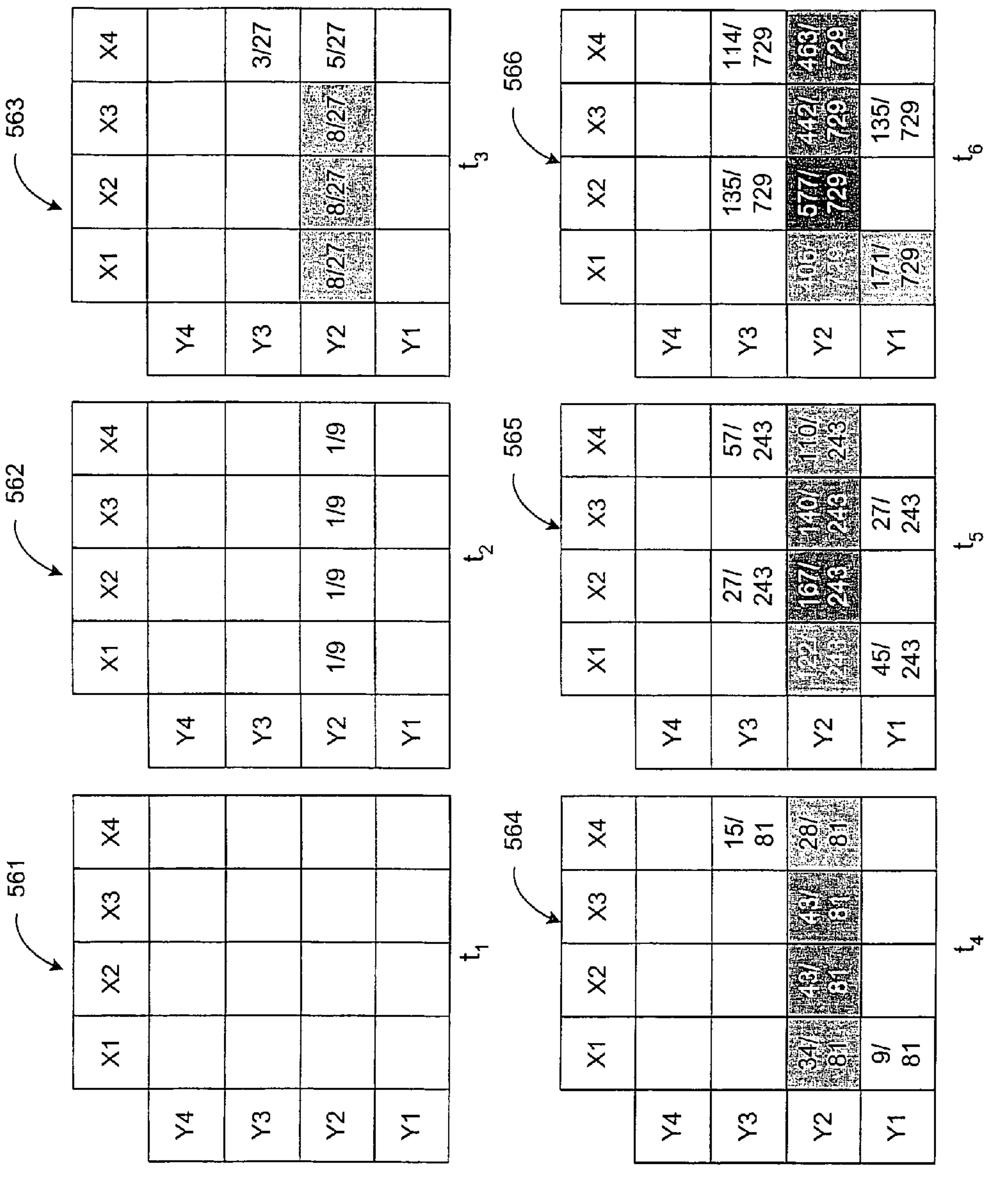
FIG. 5*b* is a sequence of schematic diagrams of the LCD panel of FIG. 1 for varying instances in time while utilizing an embodiment of the present invention, showing the relative intensities as fractions.

FIG. 5*b* is a schematic diagram of LCD 54, depicting various panels at varying instances of time illustrating gradual visual changes on Display 50 for the same signals that were depicted in FIG. 5*a*. In this representation an acquire rate of ⅓ is selected, where m=3. For simplicity, assume $I_{max}=1$.

For simplicity, Table 1 below, shows the possible $I_{t+1}$ values when m=3 and $I_{max}=1$. Such a table may facilitate quicker calculations.

TABLE 1

Possible $I_{t+1}$ Values For m = 3 and $I_{max}$ = 1

| $I_t$ | $I_{t-1}$ | $I_{t-2}$ | $I_{t+1}$ |
|---|---|---|---|
| 0 | 0 | 0 | 0 |
| 1 | 0 | 0 | 1/3 |
| 0 | 1 | 0 | 1/3 |
| 0 | 0 | 1 | 1/3 |
| 1 | 1 | 0 | 2/3 |

TABLE 1-continued

| Possible $I_{t+1}$ Values For m = 3 and $I_{max}$ = 1 | | | |
|---|---|---|---|
| $I_t$ | $I_{t-1}$ | $I_{t-2}$ | $I_{t+1}$ |
| 1 | 0 | 1 | 2/3 |
| 0 | 1 | 1 | 2/3 |
| 1 | 1 | 1 | 1 |

Time $t_1$

At time $t_1$, the pixels in the LCD Panel 560 are not illuminated, which illustrates the initial state of the LCD 50 and is identical to LCD Panel 550 as shown in FIG. 5*a*.

It is important to note that the present embodiment delays by one cycle the use of the pixel sampling. As shown above in Equation 1, $I_{(t+1)}$ is based on the prior I values of earlier times. Therefore, when comparing the panels in FIG. 5*a* and panels in FIG. 5*b*, it is important to note this time delay. Of course, in practice, a human eye would not be able to distinguish this delay which is typically between $1/24^{th}$ and $1/30^{th}$ of a second.

Time $t_2$

Between time $t_1$ and time $t_2$, LCD 50 receives instructions to illuminate each pixel on the row Y2, as shown in LCD Panel 551, where $I_2$ will be (1, 0, 0) for m=3. To determine the degree of illumination of the corresponding LCD Panel 562, Display Routine 300 completes Steps 414-422 described with reference to FIG. 4. In the present case, for pixels (X1-X4, Y2) are calculated by first determining their respective $I_2$=(1, 0, 0)=1/3. From this the display intensity, $I_{disp(2)}$ is found as $I_{disp(2)}=(I_{(2)}-I_{disp(1)})R+I_{disp(1)}=(1/3-0)1/3+0=1/9$.

Therefore, at time $t_2$, or one display cycle later, the pixels on row Y2 are illuminated to one-ninth of their total illumination as depicted in LCD Panel 561. All of the other pixels of LCD Panel 561 will be non-illuminated.

Time $t_3$

As shown in Panel 552, at time $t_3$, pixel (X4, Y3) is "on." Therefore the intensity of this same pixel in LCD Panel 563 is calculated for $I_3$=(1, 0, 0)=1/3, and therefore the $I_{disp(3)}=(I_{(3)}-I_{disp(2)})R+I_{disp(2)}=(1/3-0)1/3+0=1/9$ intensity (or 3/27).

For pixels (X1-X3, Y2), $I_3$=(1, 1, 0)=2/3, and therefore the $I_{disp(3)}=(I_{(3)}-I_{disp(2)})R+I_{disp(2)}=(2/3-1/9)1/3+1/9=8/27$ intensity.

For pixel (X4, Y2), $I_3$=(0, 1, 0)=1/3, and therefore the $I_{disp(3)}=(I_{(3)}-I_{disp(2)})R+I_{disp(2)}=(1/3-1/9)1/3+1/9=5/27$ intensity.

All of the other pixels of LCD Panel 563 will be non-illuminated.

Time $t_4$

As shown in Panel 553, pixel (X4, Y3) and pixel (X1, Y2) are turned off.

Therefore the intensity of pixel (X4, Y3) in LCD Panel 564 is calculated for $I_4$=(0, 1, 0)=1/3, and therefore the $I_{disp(3)}=(I_{(3)}-I_{disp(2)})R+I_{disp(2)}=(1/3-3/27)1/3+3/27=5/27$ intensity (or 15/81).

The intensity of pixel (X1, Y2) is calculated for $I_4$=(0, 1, 1)=2/3, and therefore the $I_{disp(3)}=(I_{(3)}-I_{disp(2)})R+I_{disp(2)}=(2/3-8/27)1/3+8/27=34/81$ intensity.

Pixels (X2-X3, Y2) have an $I_3$=(1, 1, 1)=1. Their respective display intensity is then $I_{disp(3)}=(I_{(3)}-I_{disp(2)})R+I_{disp(2)}=(1-8/27)1/3+8/27=43/81$.

Pixel (X4, Y2) has an $I_3$=(1, 0, 1)=2/3, and therefore the $I_{disp(3)}=(I_{(3)}-I_{disp(2)})R+I_{disp(2)}=(2/3-5/27)1/3+5/27=28/81$ intensity.

Pixel (X1, Y1) has an $I_3$=(1, 0, 0)=1/3, and therefore the $I_{disp(3)}=(I_{(3)}-I_{disp(2)})R+I_{disp(2)}=(1/3-0)1/3+0=1/9$ intensity (or 9/81).

All of the other pixels of LCD Panel 564 will be non-illuminated.

Time $t_5$

As shown in Display 565, at time $t_5$, pixel (X2, Y3) has an $I_5$=(1, 0, 0)=1/3 and a $I_{disp(5)}=(I_{(5)}-I_{disp(4)})R+I_{disp(4)}=(1/3-0)1/3+0=1/9$ (or 27/243).

Pixel (X4, Y3) has an $I_4$=(0, 0, 1)=1/3 and a $I_{disp(5)}=(I_{(5)}-I_{disp(4)})R+I_{disp(4)}=(1/3-15/81)1/3+15/81=57/243$.

Pixel (X1, Y2) has an $I_5$=(1, 0, 1) 2/3 and a $I_{disp(5)}=(I_{(5)}-I_{disp(4)})R+I_{disp(4)}=(2/3-34/81)1/3+34/81=122/243$.

Pixel (X2, Y2) has an $I_5$=(1, 1, 1)=1 and a $I_{disp(5)}=(I_{(5)}-I_{disp(4)})R+I_{disp(4)}=(1-43/81)1/3+43/81=167/243$.

Pixel (X3, Y2) has an $I_5$=(0, 1, 1)=2/3 and a $I_{disp(5)}=(I_{(5)}-I_{disp(4)})R+I_{disp(4)}=(2/3-43/81)1/3+43/81=140/243$.

Pixel (X4, Y2) has an $I_5$=(1, 1, 0)=2/3 and a $I_{disp(5)}=(I_{(5)}-I_{disp(4)})R+I_{disp(4)}=(2/3-28/81)1/3+28/81=122/243$.

Pixel (X1, Y1) has an $I_5$=(0, 1, 0)=1/3 and a $I_{disp(5)}=(I_{(5)}-I_{disp(4)})R+I_{disp(4)}=(1/3-1/9)1/3+1/9=5/27$ (or 45/243).

Pixel (X3, Y1) has an $I_5$=(1, 0, 0)=1/3 and a $I_{disp(5)}=(I_{(5)}-I_{disp(4)})R+I_{disp(4)}=(1/3-0)1/3+0=1/9$ (or 27/243).

All of the other pixels of LCD Panel 565 will be non-illuminated.

Time $t_6$

As shown in Display 566, at time $t_5$, pixel (X2, Y3) has an $I_5$=(0, 1, 0)=1/3 and a $I_{disp(6)}=(I_{(6)}-I_{disp(5)})R+I_{disp(5)}=(1/3-1/9)1/3+1/9=5/27$ (or 135/729).

Pixel (X4, Y3) has an $I_4$=(0, 0, 0)=0 and a $I_{disp(6)}=(I_{(6)}-I_{disp(5)})R+I_{disp(5)}=(0-57/243)1/3+57/243=114/729$.

Pixel (X1, Y2) has an $I_5$=(1, 1, 0)=2/3 and a $I_{disp(6)}=(I_{(6)}-I_{disp(5)})R+I_{disp(5)}=(2/3-122/243)1/3+122/243=406/729$.

Pixel (X2, Y2) has an $I_5$=(1, 1, 1)=1 and a $I_{disp(6)}=(I_{(6)}-I_{disp(5)})R+I_{disp(5)}=(1-167/243)1/3+167/243=577/729$.

Pixel (X3, Y2) has an $I_5$=(1, 0, 1)=2/3 and a $I_{disp(6)}=(I_{(6)}-I_{disp(5)})R+I_{disp(5)}=(2/3-140/243)1/3+140/243=442/729$.

Pixel (X4, Y2) has an $I_5$=(1, 1, 1)=1 and a $I_{disp(6)}=(I_{(6)}-I_{disp(5)})R+I_{disp(5)}=(1-110/243)1/3+110/243=463/729$.

Pixel (X1, Y1) has an $I_5$=(0, 0, 1)=1/3 and a $I_{disp(6)}=(I_{(6)}-I_{disp(5)})R+I_{disp(5)}=(1/3-45/243)1/3+45/243=19/81$ (or 171/729).

Pixel (X3, Y1) has an $I_5$=(0, 1, 0)=1/3 and a $I_{disp(6)}=(I_{(6)}-I_{disp(5)})R+I_{disp(5)}=(1/3-27/243)1/3+27/243=117/729$.

All of the other pixels of LCD Panel 565 will be non-illuminated.

One skilled in the art will appreciate that six frames typically represent no more than 0.25 seconds (assuming 24 frames per second). Therefore, in the present example, if pixels (X2, Y2) remains lit for times ($t_0$-$t_{25}$), the Intensity value after 25 frames will be 99.991% of the maximum value, as shown in Table 2.

TABLE 2

| Intensity Values for a Consistently "ON" Pixel by Frame Where m = 3 and R = 1/3 | | |
|---|---|---|
| Time | $I_t$ | Intensity |
| 1 | 0 | 0 |
| 2 | 1/3 | 0.111111111 |
| 3 | 2/3 | 0.296296296 |
| 4 | 1 | 0.530864198 |
| 5 | 1 | 0.687242798 |
| 6 | 1 | 0.791495199 |
| 7 | 1 | 0.860996799 |
| 8 | 1 | 0.907331200 |
| 9 | 1 | 0.938220800 |
| 10 | 1 | 0.958813866 |
| 11 | 1 | 0.972542578 |
| 12 | 1 | 0.981695052 |

TABLE 2-continued

Intensity Values for a Consistently "ON" Pixel by Frame Where m = 3 and R = ⅓

| Time | $I_t$ | Intensity |
|---|---|---|
| 13 | 1 | 0.987796701 |
| 14 | 1 | 0.991864467 |
| 15 | 1 | 0.994576312 |
| 16 | 1 | 0.996384208 |
| 17 | 1 | 0.997589472 |
| 18 | 1 | 0.998392981 |
| 19 | 1 | 0.998928654 |
| 20 | 1 | 0.999285769 |
| 21 | 1 | 0.999523846 |
| 22 | 1 | 0.999682564 |
| 23 | 1 | 0.999788376 |
| 24 | 1 | 0.999858917 |
| 25 | 1 | 0.999905945 |

Figure 5C:
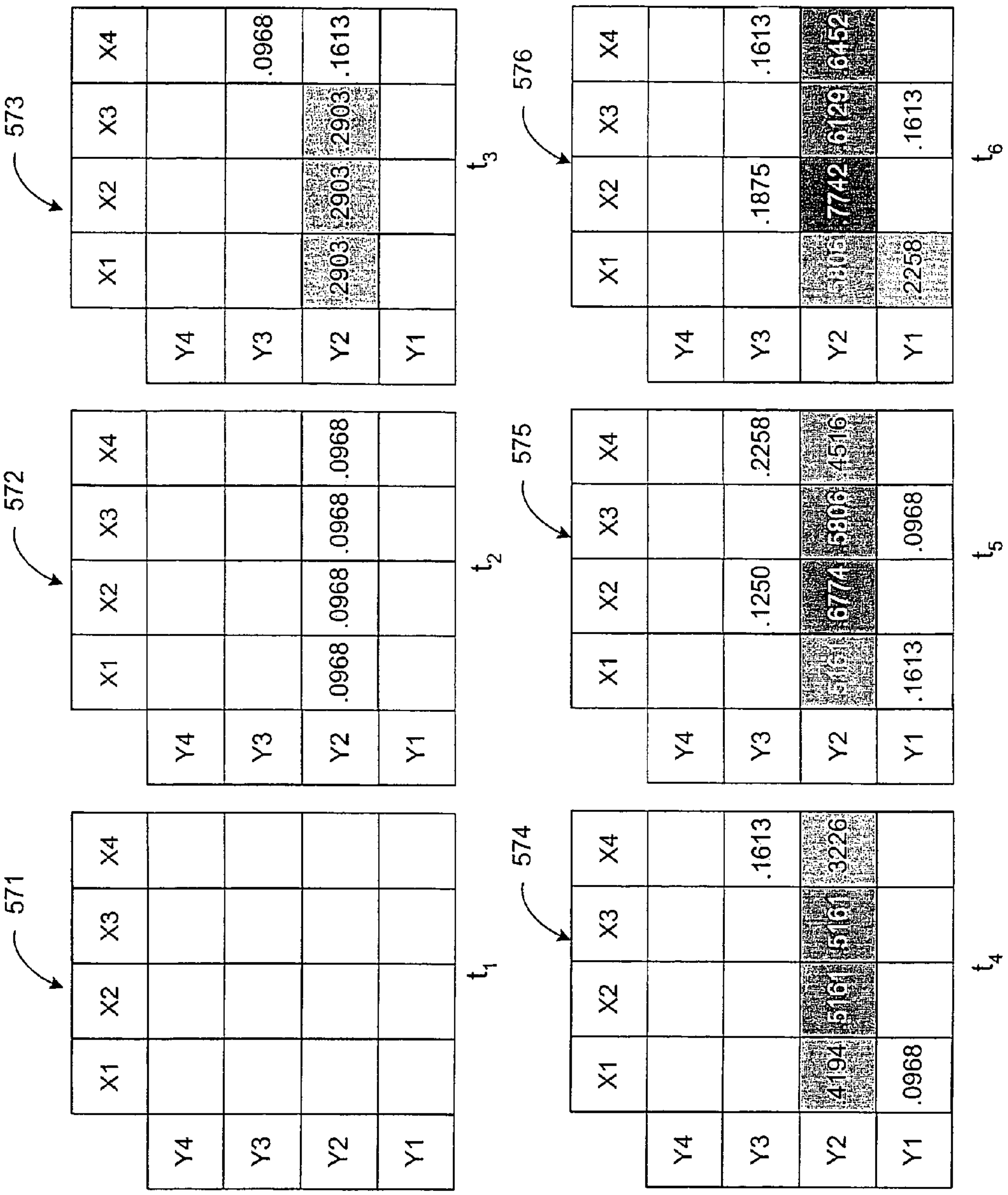
FIG. 5*c* is a second sequence of schematic diagrams of the LCD panel of FIG. 1 for varying instances in time while utilizing an embodiment of the present invention, where the storage as shown in FIG. 4*b* is utilized.

Of course FIG. 5*b* and Table 2, assumes a nearly unlimited significant digit. In practice the significant value limitation will affect the storage values. For example, if five bits are allocated to represent the intensity value for the pixel, there can only be 32 different intensity values utilized, from zero (0) intensity to full intensity (31). Therefore, as show in FIG. 5*c*, the pixel values for five significant digits, wherein the intensity is rounded to the nearest storable value in the form of x/31, where x is the bit number. This would be calculated as follows:

Time $t_2$

Between time $t_1$ and time $t_2$, LCD 50 receives instructions to illuminate each pixel on the row Y2, as shown in LCD Panel 551, where 12 will be (1, 0, 0) for m=3. To determine the degree of illumination of the corresponding LCD Panel 572, Display Routine 300 completes Steps 414-422 described with reference to FIG. 4. In the present case, for pixels (X1-X4, Y2) are calculated by first determining their respective $I_2$=(1, 0, 0)=1/3. From this the display intensity, $I_{disp(2)}$ is found as $I_{disp(2)}=(I_{(2)}-I_{disp(1)})R+I_{disp(1)}$=(1/3−0)1/3+0=1/9, which is rounded to 3/31=0.0968.

Therefore, at time $t_2$, or one display cycle later, the pixels on row Y2 are illuminated to one-ninth of their total illumination as depicted in LCD Panel 571. All of the other pixels of LCD Panel 571 will be non-illuminated.

Time $t_3$

As shown in Panel 552, at time $t_3$, pixel (X4, Y3) is "on." Therefore the intensity of this same pixel in LCD Panel 573 is calculated for $I_3$=(1, 0, 0)=1/3, and therefore the $I_{disp(3)}=(I_{(3)}-I_{disp(2)})R+I_{disp(2)}$=(1/3−0)1/3+0=1/9 intensity which is rounded to 3/31=0.0968.

For pixels (X1-X3, Y2), $I_3$=(1, 1, 0)=2/3, and therefore the $I_{disp(3)}=(I_{(3)}-I_{disp(2)})R+I_{disp(2)}$=(2/3−3/31)1/3+3/31=0.28674 which is rounded to 9/31=0.2903.

For pixel (X4, Y2), $I_3$=(0, 1, 0)=1/3, and therefore the $I_{disp(3)}=(I_{(3)}-I_{disp(2)})R+I_{disp(2)}$=(1/3−3/31)1/3+3/31=0.17563 which is rounded to 5/31=0.1613.

All of the other pixels of LCD Panel 563 will be non-illuminated.

Time $t_4$

As shown in Panel 553, pixel (X4, Y3) and pixel (X1, Y2) are turned off.

Therefore the intensity of pixel (X4, Y3) in LCD Panel 574 is calculated for $I_4$=(0, 1, 0)=1/3, and therefore the $I_{disp(3)}=(I_{(3)}-I_{disp(2)})R+I_{disp(2)}$=(1/3-3/31)1/3+3/31=0.17563 which is rounded to 5/31=0.1613.

The intensity of pixel (X1, Y2) is calculated for $I_4$=(0, 1, 1)=2/3, and therefore the $I_{disp(3)}=(I_{(3)}-I_{disp(2)})R+I_{disp(2)}$=(2/3−9/31)1/3+9/31=0.41577 which is rounded to 13/31=0.4194.

Pixels (X2-X3, Y2) have an $I_3$=(1, 1, 1)=1. Their respective display intensity is then $I_{disp(3)}=(I_{(3)}-I_{disp(2)})R+I_{disp(2)}$=(1−9/31)1/3+9/31=0.52688 which is rounded to 16/31=0.5161.

Pixel (X4, Y2) has an $I_3$=(1, 0, 1)=2/3, and therefore the $I_{disp(3)}=(I_{(3)}-I_{disp(2)})R+I_{disp(2)}$=(2/3−5/31)1/3+5/31=0.32975 which is rounded to 10/31=0.3226.

Pixel (X1, Y1) has an $I_3$=(1, 0, 0)=1/3, and therefore the $I_{disp(3)}=(I_{(3)}-I_{disp(2)})R+I_{disp(2)}$=(1/3−0)1/3+0=1/9 which is rounded to 3/31=0.0968.

All of the other pixels of LCD Panel 574 will be non-illuminated.

Time $t_5$

As shown in Display 555, at time $t_5$, pixel (X2, Y3) has an $I_5$=(1, 0, 0)=1/3 and a $I_{disp(5)}=(I_{(5)}-I_{disp(4)})R+I_{disp(4)}$=(1/3−0)1/3+0=1/9 which is rounded to 3/31=0.0968.

Pixel (X4, Y3) has an $I_4$=(0, 0, 1)=1/3 and a $I_{disp(5)}=(I_{(5)}-I_{disp(4)})R+I_{disp(4)}$=(1/3−0.5/31)1/3+5/31=0.21864 which is rounded to 7/31=0.2258.

Pixel (X1, Y2) has an $I_5$=(1, 0, 1)=2/3 and a $I_{disp(5)}=(I_{(5)}-I_{disp(4)})R+I_{disp(4)}$=(2/3−13/31)1/3+13/31=0.50179 which is rounded to 16/31=0.5161.

Pixel (X2, Y2) has an $I_5$=(1, 1, 1)=1 and a $I_{disp(5)}=(I_{(5)}-I_{disp(4)})R+I_{disp(4)}$=(1−16/31)1/3+16/31=0.67742 which rounds to 21/31=0.6774.

Pixel (X3, Y2) has an $I_5$=(0, 1, 1)=2/3 and a $I_{disp(5)}=(I_{(5)}-I_{disp(4)})R+I_{disp(4)}$=(2/3−16/31)1/3+16/31=0.56631 which is rounded to 0.5806.

Pixel (X4, Y2) has an $I_5$=(1, 1, 0)=2/3 and a $I_{disp(5)}=(I_{(5)}-I_{disp(4)})R+I_{disp(4)}$=(2/3−10/31)1/3+10/31=0.43728 which is rounded to 14/31=0.4516.

Pixel (X1, Y1) has an $I_5$=(0, 1, 0)=1/3 and a $I_{disp(5)}=(I_{(5)}-I_{disp(4)})R+I_{disp(4)}$=(1/3−3/31)1/3+3/31=0.17563 which rounds to 5/31=0.1613.

Pixel (X3, Y1) has an $I_5$=(1, 0, 0)=1/3 and a $I_{disp(5)}=(I_{(5)}-I_{disp(4)})R+I_{disp(4)}$=(1/3−0)1/3+0=1/9 which rounds to 3/31=0.0968.

All of the other pixels of LCD Panel 575 will be non-illuminated.

Time $t_6$

As shown in Display 556, at time $t_5$, pixel (X2, Y3) has an $I_5$=(0, 1, 0)=1/3 and a $I_{disp(6)}=(I_{(6)}-I_{disp(5)})R+I_{disp(5)}$=(1/3−0.125)1/3+0.125=0.19444 which rounds to 0.1875.

Pixel (X4, Y3) has an $I_4$=(0, 0, 0)=0 and a $I_{disp(6)}=(I_{(6)}-I_{disp(5)})R+I_{disp(5)}$=(0−7/31)1/3+7/31=0.15054 which rounds to 5/31=0.1613.

Pixel (X1, Y2) has an $I_5$=(1, 1, 0)=2/3 and a $I_{disp(6)}=(I_{(6)}-I_{disp(5)})R+I_{disp(5)}$=(2/3−16/31)1/3+16/31=0.56631 which is rounded to 18/31=0.5806.

Pixel (X2, Y2) has an $I_5$=(1, 1, 1)=1 and a $I_{disp(6)}=(I_{(6)}-I_{disp(5)})R+I_{disp(5)}$=(1−21/31)1/3+21/31=0.78495 which is rounded to 24/31=0.7742.

Pixel (X3, Y2) has an $I_5$=(1, 0, 1)=2/3 and a $I_{disp(6)}=(I_{(6)}-I_{disp(5)})R+I_{disp(5)}$=(2/3−21/31)1/3+21/31=0.6129 which is rounded to 19/31=0.6129.

Pixel (X4, Y2) has an $I_5$=(1, 1, 1)=1 and a $I_{disp(6)}=(I_{(6)}-I_{disp(5)})R+I_{disp(5)}$=(1−14/31)1/3+14/31=0.63441 which is rounded to 20/31=0.6452.

Pixel (X1, Y1) has an $I_5$=(0, 0, 1)=1/3 and a $I_{disp(6)}=(I_{(6)}-I_{disp(5)})R+I_{disp(5)}$=(1/3−5/31)1/3+5/31=0.21864 which is rounded to 7/31=0.2258.

Pixel (X3, Y1) has an $I_5$=(0, 1, 0)=1/3 and a $I_{disp(6)}=(I_{(6)}-I_{disp(5)})R+I_{disp(5)}$=(1/3−3/31)1/3+3/31=0.17563 which is rounded to 5/31=0.1613.

All of the other pixels of LCD Panel 575 will be non-illuminated.

Therefore, in the present example, if pixel (X2, Y2) remains lit for times ($t_0$-$t_{10}$), the Intensity value will reach 30/31 after 10 cycles, as shown in Table 3. One skilled in the art will appreciate that the range for a 5 bit value will be from 0/31 to 31/31. As the present example will never reach 30/31 mathematically, it is preferred to step up the value to 31/31 upon reaching 30/31 or upon maintaining the value of 30/31 for a predetermined number of frames. This is shown in Table 3, for the eleventh (11) frame.

TABLE 3

Intensity Values for a Consistently "ON" Pixel by Frame Where m = 3 and R = ⅓

| Time | $I_r$ | Intensity | Intensity |
|---|---|---|---|
| 1 | 0 | 0 | 0 |
| 2 | 1/3 | 3/31 | 0.0968 |
| 3 | 2/3 | 9/31 | 0.2903 |
| 4 | 1 | 16/31 | 0.5161 |
| 5 | 1 | 21/31 | 0.6774 |
| 6 | 1 | 24/31 | 0.7742 |
| 7 | 1 | 26/31 | 0.8387 |
| 8 | 1 | 28/31 | 0.9032 |
| 9 | 1 | 29/31 | 0.9355 |
| 10 | 1 | 30/31 | 0.9677 |
| 11 | 1 | 31/31 | 1 |

Other alternatives include adding a display weighting function to allow for the maximum intensity value to be reached at 30/31 or to modify the equations to provide the ability to reach the maximum value of 31/31.

Additionally, one could utilize at least one additional value (e.g. $2^n$+1 or 33 values in a 5 bit memory partition). Determining if, in one or more prior cycles, the pixel was illustrated will allow for at least one additional value. For example, if all of the preceding illumination times are "on", the it will be clear that a intensity value wherein all of the bits are zero, would actually symbolize the maximum intensity (32/31 in the present case). Additionally, this may be true for values of 1/31 (or higher) to represent, in actuality, 33/31 provide prior history bits show such an illumination. Therefore, it may be possible to increase the number of values for a n bit memory space for the intensity values for more than $2^n$+1 based on the rates the equations provide. Conversely, if there is an intensity value where all the bits are zero and the preceding illumination times are "off" then the intensity value is the minimum (0/31 in the present case).

By example, turning the reader's attention back to FIG. 4*b*, the intensity portion of the memory array would be bits 459-466, which the history portion of the memory array would be bits 452-456. Typically, if all the intensity bits 459-466 were set to one or "on" the standard practice would be to read them as the value 31. While if all the intensity bits 459-466 were set to zero or "off" then the value would be read as zero, giving the range of 0-31 for 32 possible values, or the range of 0-$2^n$−1 for $2^n$ possible values, where n represents the number of intensity bits in the array 450. However, if the intensity bits 459-466 were all set to zero, while the history bits 452-456 were all set to one, indicating constant illumination for all the past cycles, the value should be read as $2^n$ or 32. In the same case not all of the history bits would necessarily need to be set to one, depending on the equations utilized. Furthermore, values higher than $2^n$ or 32 can be stored. For example, if all the history bits 452-456 were all set to one, and the intensity bits 459-464 were set to zero and the lowest intensity bit 466 was set to one (1), then the value stored would be $2^n$+1 or 33. High values can be stored, provide the intensity equations ensure that multiple values wouldn't exist.

This methodology requires some basic programming logic to inquire the history values when reading a "null" value to determine if the null value (all zeros) actually represents the maximum value, as well as writing only to the intensity portion (e.g., the memory partition), of the memory array.

Additionally, one skilled in the art will appreciate that if a negative value is returned, it will be rounded up to zero, as a pixel cannot typically represent a negative intensity value.

One skilled in the art will also appreciate that "on-the-fly" changes of the R value, or even the m value, can be performed in additional embodiments of the present invention. If an "on-the-fly" change of the m value, it will be important, if limited to a certain bit size for the pixel, to appropriately convert the pixel intensity to the bit requirements, as well as adding the illumination history data.

This "on-the-fly" changes can facilitate what the user perceives as the "optimal" view based on the signal being received, the user's personal preferences, and the environment in which the device is being utilized. Different users may have different light sensitivity as well as latency characteristics that can affect the "optimal" values for that user. Additionally the ambient light in the environment may affect the desired settings.

Figure 6:
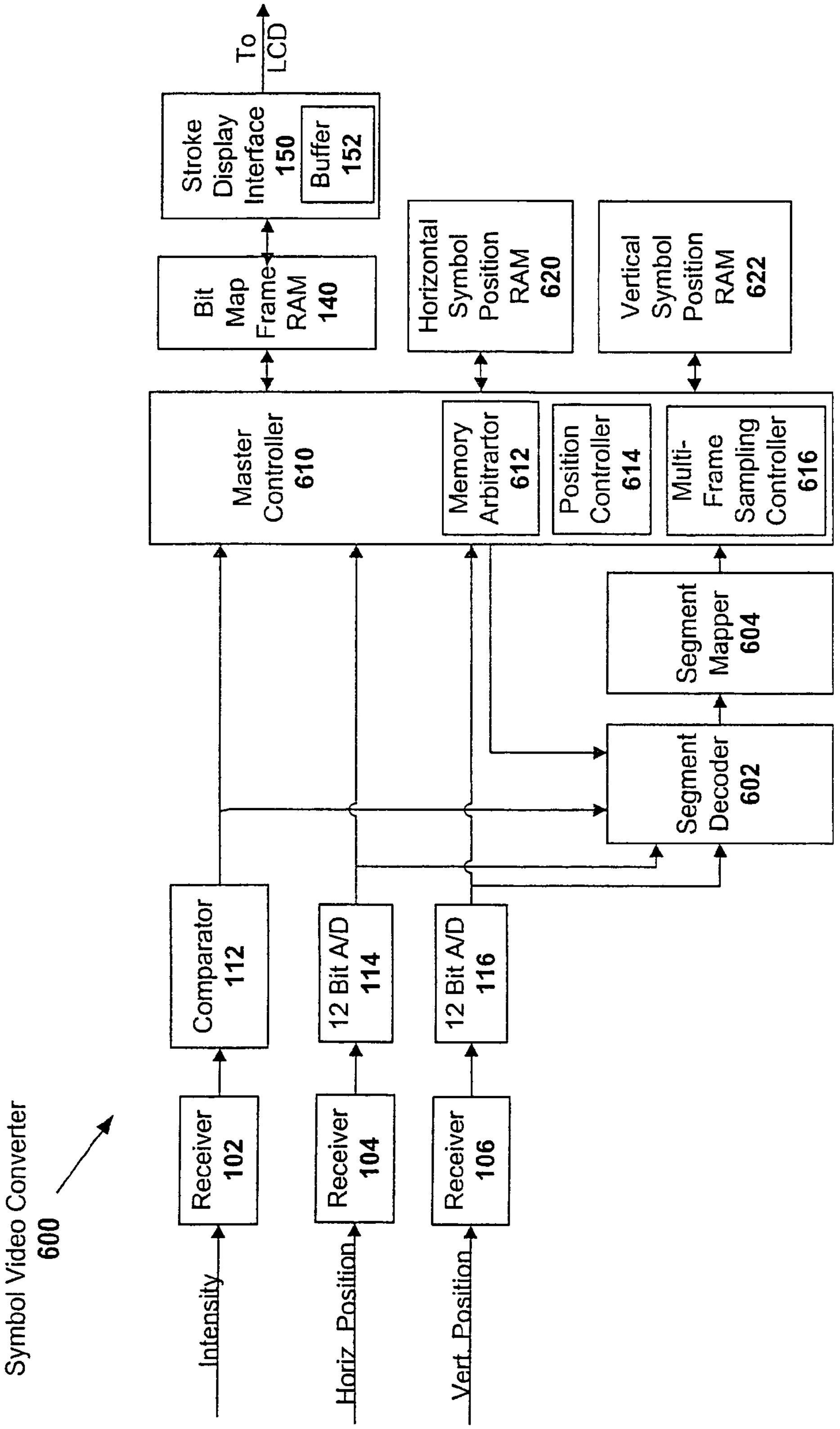
FIG. 6 is a block diagram of an alternative embodiment of the video converter of FIG. 2 illustrating separate symbol circuitry.

FIG. 6 is a block diagram of a second embodiment of Video Converter 52 illustrating separate symbol circuitry. Symbol, as used herein, generally refers to alphabetical characters, numerical characters, punctuation, as well as any other typographical representation or other symbols which are consistent in shape.

Symbol Video Converter 600 includes Segment Decoder 602 and Segment Mapper 604. Segment Decoder 602 is connected to the outputs of Comparator 112 and A/D Converters 114, 116.

Connecting unit size strokes can form symbols. To form a character, a first segment can identify the center of the character cell, or area where the character is drawn. A subsequent segment can move in one of the eight directions from the center (assuming an allowed angle of 45 degrees) and indicate whether the pixel should be on/off. The next segment can be in one of the eight directions from the previous segment and also indicate if the segment should be illuminated. When the character ends, it can return to the cell's center with the brightness off. Segment Decoder 602 converts the pixel data received from A/D Converters 114, 116 into these unit segments.

As Receivers 102, 104, 106 receive pixel data that represents a symbol, Comparator 112 activates Segment Decoder 602. This decoder is a state machine that is preferably implemented inside of a Field Programmable Gate Array (FPGA). It contains the rules that are applicable to decoding the type of a segment for a particular stroke display generator. One skilled in the art will appreciate that typically stroke display generators are likely to have different drawing rates, signal amplitudes and allowed angles of segments while drawing symbols.

Segment Mapper 604 scales these unit segments to accommodate specific dimensions of LCD 54. That is, Segment Mapper 604 can either enlarge or reduce the segments that form the symbol to enable effective display on LCD Panel 54.

Master Controller 606 functions as Memory Arbitrator 612, Multi-Frame Sampling Controller 614, and Position Controller 616. Because symbols often have smaller dimensions than circles/lines, the presence of noise can considerably impair the visual clarity of the symbol. In addition, human eyes can effectively detect the symbol's slightest movement. To combat this, Symbol Video Converter 600 uses Position Controller 614.

Position Controller 614 restricts displacement of a symbol's center during refresh cycles unless the displacement exceeds a predefined threshold, or locking width. In this manner, Symbol Video Converter 600 gently anchors the symbol at a specific location. Thus, noise that could cause a slight movement of the symbol, and therefore a distraction for the user, is filtered out. As discussed prior, subsequent slight movements produce "jitter" for which this present embodiment can decrease. Position Controller 614 accomplishes this filtering by calculating the new horizontal and vertical symbol positions based on the previous positions and locking width. This process is described in greater detail with reference to FIG. 7 subsequently.

After calculating these positions, Memory Arbitrator 612 stores the horizontal symbol position in Horizontal Symbol Position RAM 620. In addition, Memory Arbitrator 612 stores the vertical symbol position in Vertical Symbol Position RAM 622. When the symbol is formed and the position determined, Multi-frame Sampling Controller 616 and Memory Arbitrator 612 can transfer the symbol and center position to Memory 140.

Figure 7:
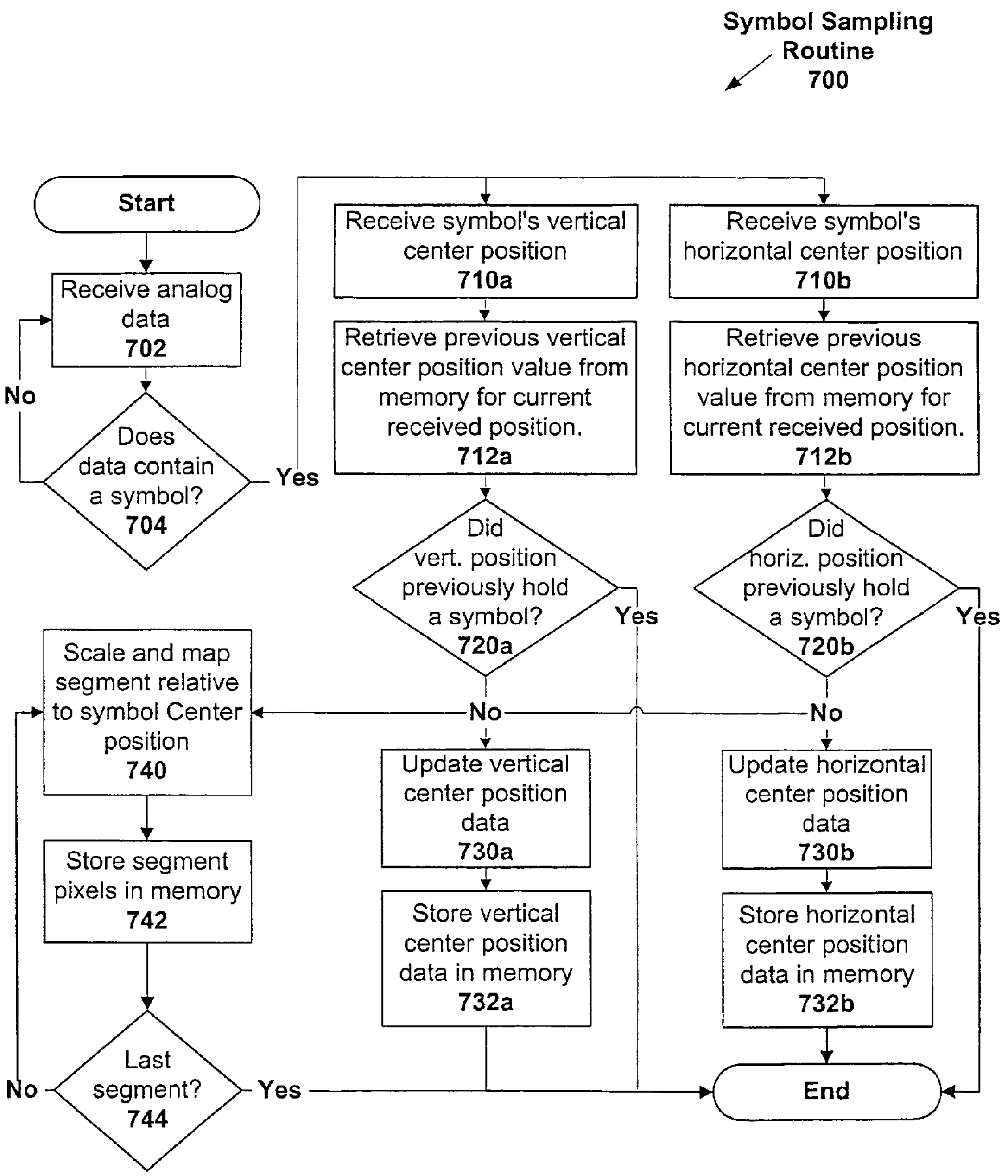
FIG. 7 is a logic flow diagram illustrating a sampling routine for the video converter of FIG. 6.

FIG. 7 is a logic flow diagram illustrating Sampling Routine 700 for Symbol Video Converter 600. Typically, Symbol Sampling Routine 700 is longer than Sampling Routine 200 because of symbol decoding. In Step 702, Symbol Sampling Routine 700 receives analog data or vector data from Stroke Video Source 40.

Step 702 is followed by decision Step 704, in which Symbol Sampling Routine 700 determines if the data received is a symbol. That is, Symbol Sampling Routine 700 recognizes the received data as a known symbol instead of simply a shape, such as a circle or line. Generally, Comparator 112 outputs a signal that a known symbol was received. If the data contains a symbol, Symbol Sampling Routine 700 continues. Otherwise, Symbol Sampling Routine 700 will continue to "wait" for a symbol to be found in the data received.

FIG. 7 is a logic flow diagram illustrating Symbol Sampling Routine 700 for Symbol Video Converter 600. Typically, Symbol Sampling Routine 700 is longer than Sampling Routine 200 because of symbol decoding. In Step 702, Symbol Sampling Routine 700 receives analog data or vector data from Stroke Video Source 40.

Step 702 is followed by decision Step 704, in which Symbol Sampling Routine 700 identifies the data received contains a symbol. That is, Symbol Sampling Routine 700 recognizes the received data as a known symbol instead of simply a shape, such as a circle or line. Generally, Comparator 112 outputs a signal that a known symbol was contained in the data received. After identifying the data as containing a symbol, Symbol Sampling Routine 700 initiates the remainder of Symbol Sampling Routine 700 which provides means to determine if the "found" symbol has "moved" due to noise or "jitter" as opposed to the appearance of a new symbol.

Step 704 is followed by Steps 710*a-b*, which are run in parallel. Step 710*a* receives the symbol's vertical center position while Step 710*b* receives the symbol's horizontal center position. The reader will notice that the two branches are for the vertical position and the horizontal position aspects of the symbol, designated by "a" and "b" respectively.

Step 710*a* is followed by Step 712*a*, which retrieves vertical center position value from Vertical Symbol Position RAM 622 for the current received position.

Step 712*a* is followed by decision Step 720*a*, which determines if the specified vertical center position previously held a symbol. To complete this step, Position Controller 614 within Master Controller 610 processes the vertical symbol position for the received center position.

Step 720*a* is followed, in parallel, by Steps 730*a* and Step 740. In Step 730, Symbol Sampling Routine 700 determines the symbol's new vertical position value for the center position. In making this determination, Position Controller 614 subtracts the present center position from the retrieved value. Subsequently, Position Controller 614 determines if this difference is within the specified tolerance range or locking width. This tolerance range could be fixed, adjustable, or user controlled. That is, Symbol Selection Routine 700 restricts the symbol from movement if the new position lies inside of the tolerance range. Thus, the position controller enables deliberate symbol movement, which will lie outside of the tolerance range, but eliminates transient symbol movement, such as wiggling, which lies inside the tolerance range.

Additionally, the symbol can be any repeatable representation or pattern. For example, Comparator 112 can be made to recognize prior used patterns or representations which were present in a prior refresh cycle Step 730*a* is followed by Step 732*a*, which stores vertical center position data in Vertical Symbol Position RAM 622. Step 732*a* is then followed by the end step.

Running in parallel, Step 710*b* is followed by Step 712*b*, which retrieves horizontal center position value from Horizontal Symbol Position RAM 622 for the current received position.

Step 712*b* is followed by decision Step 720*b*, which determines if the specified horizontal center position previously held a symbol. To complete this step, Position Controller 614 within Master Controller 610 processes the horizontal symbol position for the received center position.

Step 720*b* is followed, in parallel, by Steps 730*b* and Step 740. In Step 730*b*, Symbol Sampling Routine 700 determines the symbol's new horizontal position value for the center position. In making this determination, Position Controller 614 subtracts the present center position from the retrieved value. As discussed with the vertical process, Position Controller 614 determines if this difference is within the specified tolerance range or locking width.

Step 730*b* is followed by Step 732*b*, which stores horizontal center position data in Horizontal Symbol Position RAM 622. Step 732*a* is then followed by the end step.

One skilled in the art will appreciate that it is possible that the Horizontal Symbol Position RAM 620 needs updating while the Vertical Symbol Position RAM 622 does not, or vice versa.

As discussed prior, if in either of the decision Steps 720*a-b*, the vertical or horizontal position, respectively, previously held a symbol, then Step 740 follows. In Step 740, Symbol Sampling Routine 700 scales and map the received segment relative to the symbol's center position. To accomplish this, Step 740 identifies the segment as a particular letter or character. Generally, Segment Decoder 602 does this. The segment is then mapped into a symbol. The segment has to be mapped to relative to the center of the symbol, i.e. it is has to be determined where the segment starts. The segment is preferably scaled. The scaling of the segment adjusts the segment to fit the appropriate size of the LCD 54. One skilled in the art will appreciate that the segment is preferably scaled to the number of pixels that a segment would require for proper viewing by the user. This scaling may be different in the horizontal and vertical directions as typically characters are drawn taller than they are wide.

Followed by Step 740 is Step 742, which stores the segment pixel(s) in Memory 140. Step 742 is followed by decision Step 744, where Symbol Sampling Routine 700 determines if it received the last segment of the symbol. If it has not received last segment, the "no" branch is followed from Step 744 to Step 740 and the scale and map segment relative to the symbol center position process is repeated. Otherwise, the "Yes" branch is followed from Step 744 to the "End" step.

Figure 8:
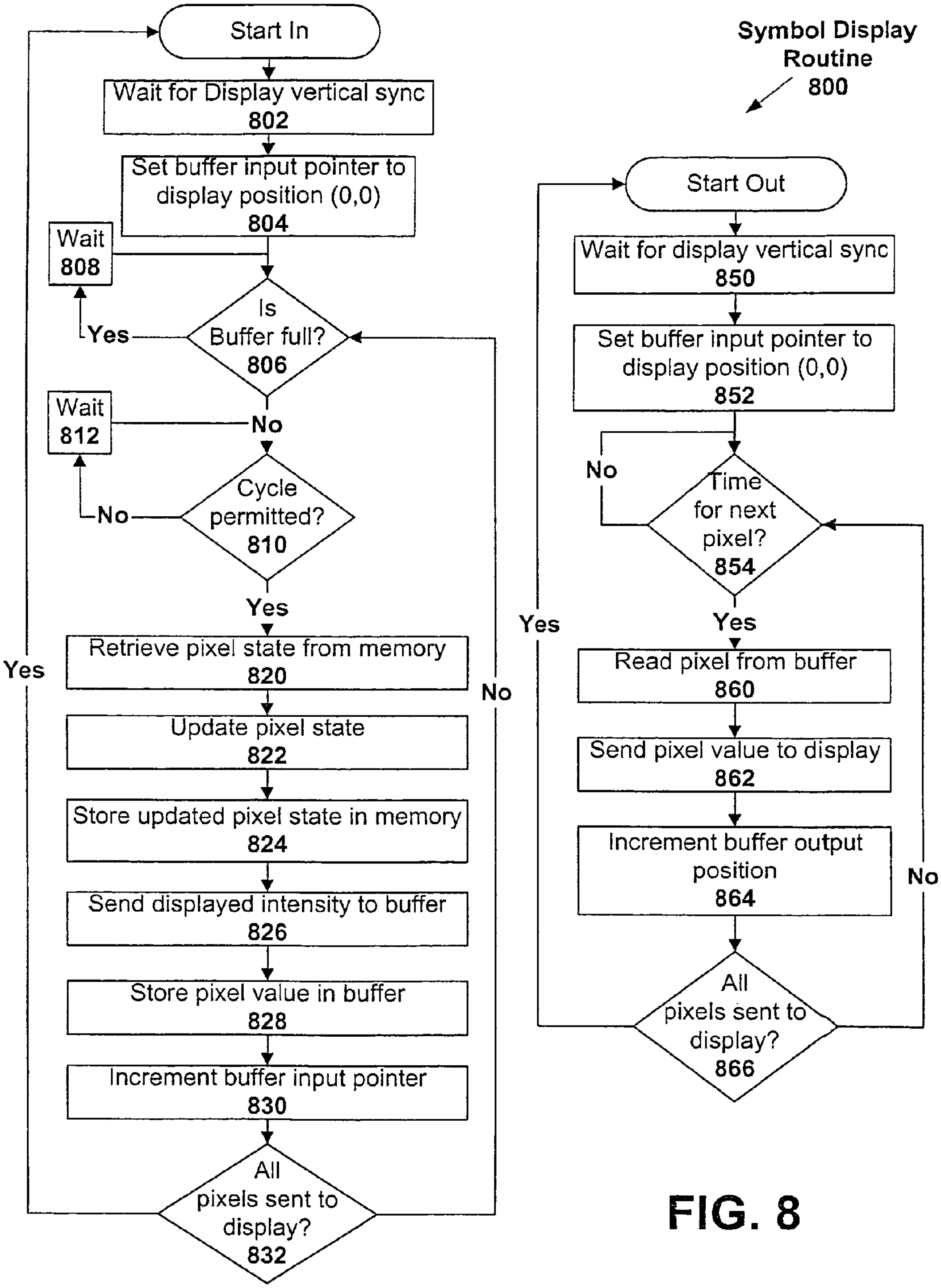
FIG. 8 is a logic flow diagram illustrating a display routine for the video converter of FIG. 6.

FIG. 8 is a logic flow diagram illustrating Symbol Display Routine 800 for Symbol Video Converter 600. Symbol Display Routine 800 operates similarly to Display Routine 300 except for differences in the buffer filling process. For the sake of brevity, the buffer emptying process will not be described again. In an alternative embodiment, Symbol Display Routine 800 could be identical to Symbol Video Converter 600.

To fill Buffer 152, Symbol Display Routine 800 begins at "Start In" and is followed by Step 802. In Step 802, Symbol Display Routine 800 waits for the display vertical synchronization. Step 802 is followed by Step 804, in which Symbol Display Routine 800 sets the buffer pointer to the home display position (0, 0). In other words, Display Interface 150 initializes the position of Buffer 152 to a set home position. Step 804 is followed by decision Step 806, in which Symbol Display Routine 800 determines if Buffer 152 is full. If Buffer 152 is full, the "yes" branch is followed from Step 806 to Step 808. In this step, Symbol Display Routine 800 waits a designated amount of time before polling Buffer 152 again. Step 808 returns to Step 806 in which Symbol Display Routine 800 once again determines if Buffer 152 is full again. If Buffer 152 is not full, the "No" branch is followed from Step 806 to Step 810.

In Step 810, Symbol Display Routine 800 determines if the display cycle is permitted. If the cycle is not permitted, the "No" branch is followed from Step 810 to Step 812. In this step Symbol Display Routine 800 waits a designated amount of time. Step 812 is followed by a repeat of step 810 in which Symbol Display Routine 800 once again determines if the cycle is permitted. If the cycle is permitted, Step 810 is followed by Step 820 in which Symbol Display Routine 800 requests stored pixel values. That is, Display Interface 150 requests pixel values stored Memory 140.

Step 820 is followed by Step 822, which updates the pixel values. In updating the pixel values Symbol Display Routine 800 stores the present value in the same memory location where the previous value was located. To update the pixel value, the Symbol Display Routine 800 can completely illuminate or darken the pixel. That is, this routine preferably does not gradually illuminate or darken. This is appropriate as a symbol is not "noise" by default. Rather, the present embodiment is designed to limit the movement, or positional change, of the symbol in Display Interface 150.

Step 822 is followed by Step 824, where Symbol Display Routine 800 stores the updated value in Memory 140. Step 824 is followed by Step 826 in Display Interface 150 retrieves stored values from Memory 140. Step 826 is followed by Step 828 in which the retrieved values are stored in Buffer 152. Step 828 is followed by Step 830 in which the input position of Buffer 152 is incremented. Step 830 is followed by decision Step 832 in which Symbol Display Routine 800 determines if all pixels were sent to Display Interface 150. If all pixels were sent, the "Yes" branch is followed from Step 832 to the "Start In" step and the filling process is reset. Otherwise, the "No" branch is followed from Step 832 to Step 806 and Symbol Display Routine 800 can continue filling Buffer 152.

Figure 9:
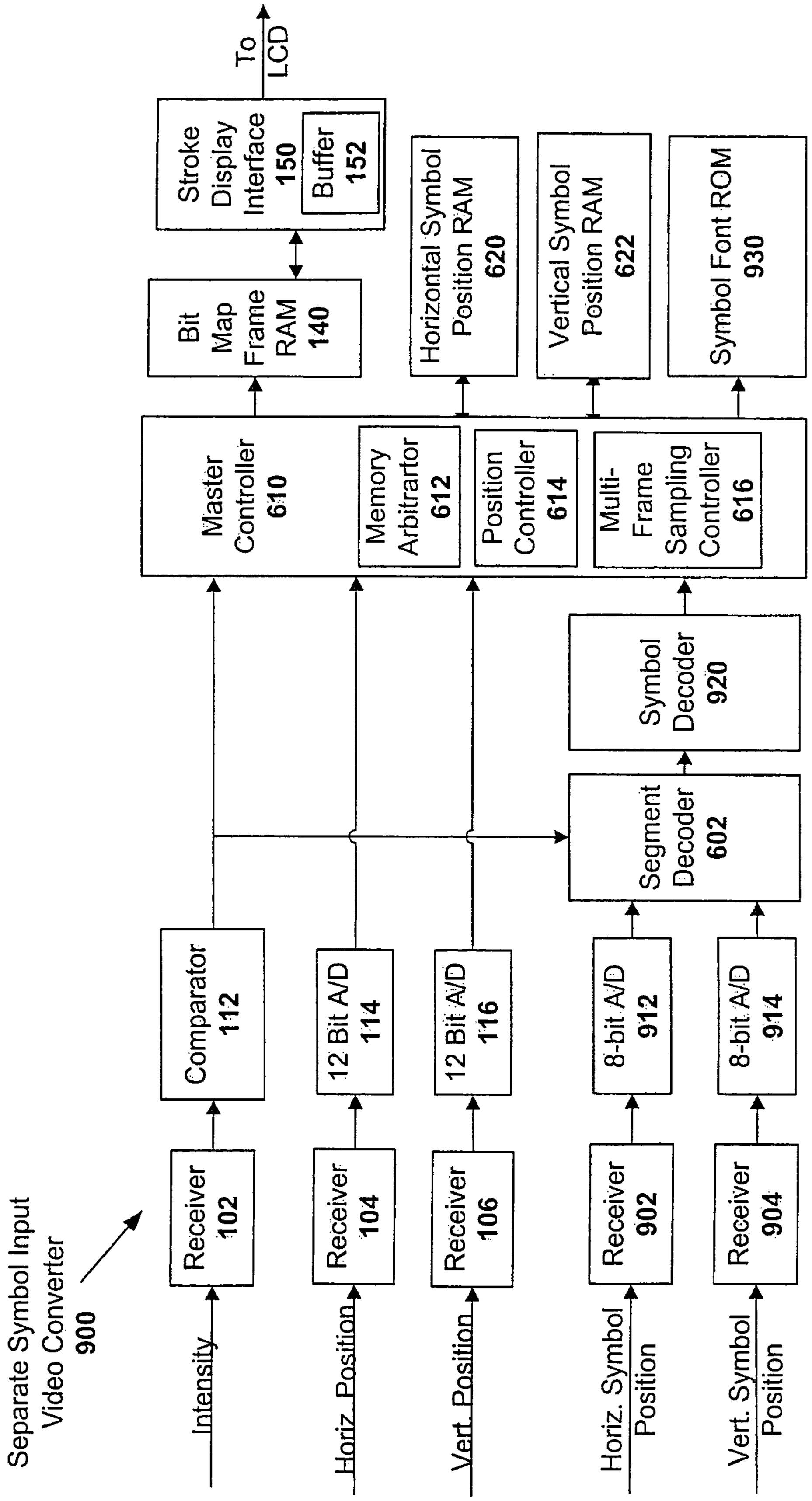
FIG. 9 is a block diagram illustrating another alternative embodiment of the video converter of FIG. 2 illustrating the use of fonted symbols.

FIG. 9 is a block diagram of Separate Symbol Inputs Video Converter 900, which is illustrating a third embodiment of Video Converter 52. Separate Symbol Inputs Video Converter 900 includes a Horizontal Position Receiver 902 and a Vertical Position Receiver 904 connected to the respective horizontal and vertical symbol position inputs. Horizontal 8-bit A/D Converter 912 connects to the output of Horizontal Position Receiver 902. Similarly, Vertical 8-bit A/D converter 914 connects to the output of Vertical Position Receiver 904.

In this embodiment, Segment Decoder 602 connects to A/D Converters 902 and 904. By using separate symbol inputs, Separate Symbol Inputs Video Converter 900 can receive the symbol's center position on the main inputs while receiving the actual symbol segments on the symbol inputs. Because separate inputs produce a better signal to noise ratio, detailed, or fine, symbols can be produced more effectively.

As described with reference to FIG. 6, Segment Decoder 602 converts the received data into the individual segments. Separate Symbol Inputs Video Converter 900 includes Symbol Decoder 920 that identifies the symbol formed from the segments received from Segment Decoder 602. To implement Symbol Decoder 920 in hardware, a designer could use a field programmable gate array or a programmable read only memory. Generally, Symbol Decoder 920 functions as a state machine with a library of symbols and characters. As data is received, this state machine determines if the data is valid or corresponds to a valid character/symbol.

In addition, Separate Symbol Inputs Video Converter 900 includes Read Only Memory in the form of Symbol Font ROM 930. Symbol Font ROM 930 includes a host of character fonts permanently stored in it. Furthermore, for specific applications one skilled in the art can place specific representations and/or patterns in Symbol Font ROM 930, which are likely to be encountered in that application. Therefore, Symbol Font ROM 930 can be made to contain a plethora of representations. Additionally embodiments may include having Comparator 112 or another device recognize repeated patterns or representations. Then, if Symbol Font ROM 930 is replaced with a write access memory device, these patterns and or representations can be recorded and used as described in the present embodiment.

As Symbol Decoder 920 identifies a symbol from the individual segments, Master Controller 610 can retrieve the corresponding fonted symbol from Symbol Font ROM 930. In this manner, the symbol displayed on the LCD 54 can be displayed faster because Symbol Decoder 920 can identify the symbol without processing every segment. In addition, using fonted symbols can have improved clarity. The fonted symbols can be designed for ergonomic display on the selected LCD 54.

Figure 10:
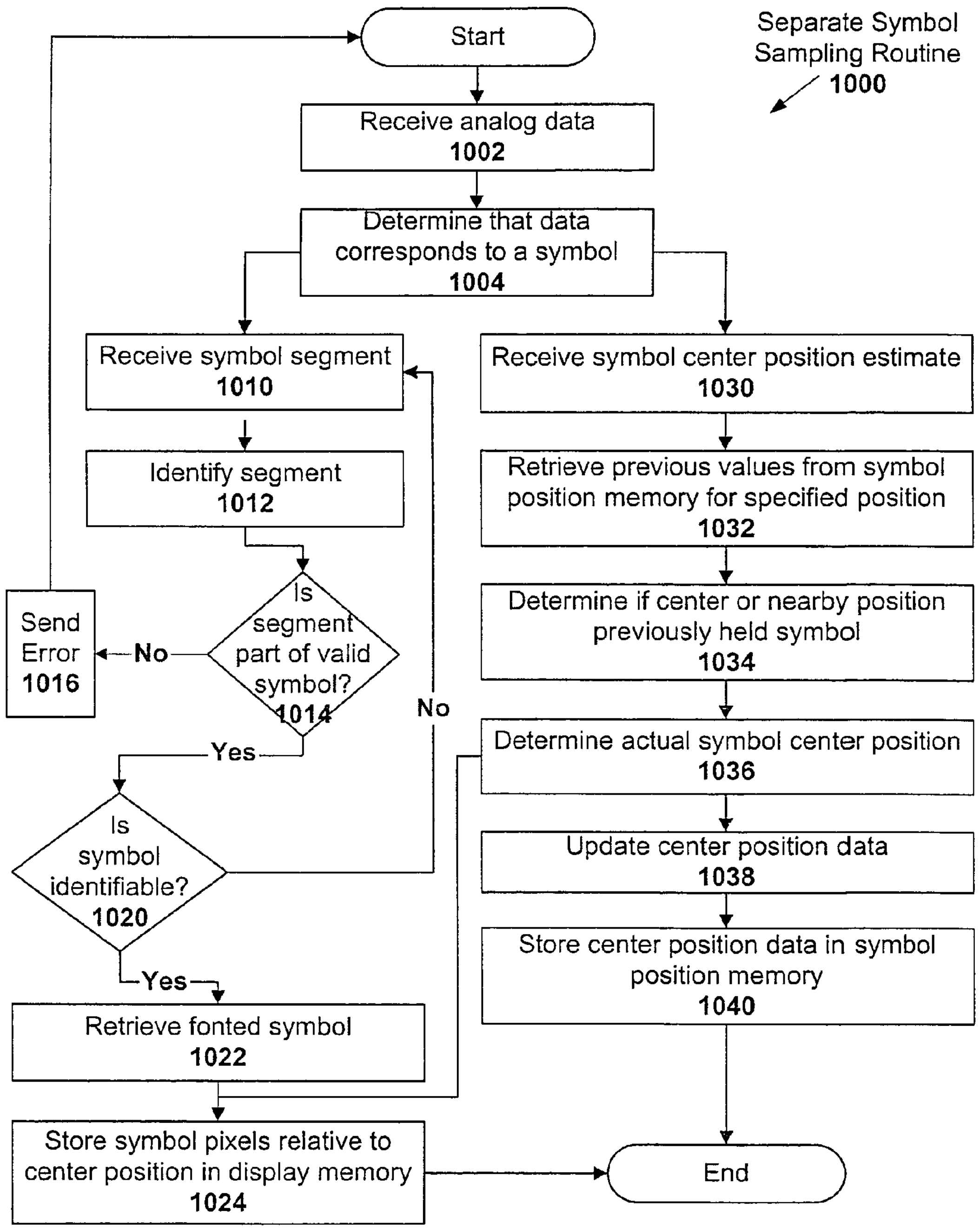
FIG. 10 is a logic flow diagram illustrating a sampling routine for the video converter of FIG. 9.

FIG. 10 is a logic flow diagram illustrating Separate Symbol Sampling Routine 1000 for Separate Symbol Input Video Converter 900. Following the Start Step is Step 1002, where Separate Symbol Sampling Routine 1000 receives analog data.

Step 1002 is followed by Step 1004, in which Separate Symbol Sampling Routine 1000 determines that the data corresponds to a symbol.

Step 1004 is followed by parallel steps of Step 1010 and Step 1030.

In Step 1010, Separate Symbol Sampling Routine 1000 receives the symbol segment. Step 1010 is followed by Step 1012, in which Separate Symbol Sampling Routine 1000 identifies a segment.

Step 1012 is followed by decision Step 1014, in which Separate Symbol Sampling Routine 1000 determines if the segment is a part of a valid symbol. If the segment is not part of a valid symbol, Separate Symbol Sampling Routine 1000 follows the "No" branch from Step 1014 to Step 1016. In Step 1016, Separate Symbol Sampling Routine 1000 sends an error message. Step 1016 is followed by the "Start" step, which resets Separate Symbol Sampling Routine 1000.

If the symbol is part of a valid segment, Separate Symbol Sampling Routine 1000 follows the "Yes" branch from Step 1014 to Step 1020. In Step 1020, Separate Symbol Sampling Routine 1000 determines if the symbol is identifiable. That is, can Symbol Decoder 920 uniquely identify the symbol? If the symbol is not identifiable, the "No" branch is followed from Step 1020 to Step 1010 and Separate Symbol Sampling Routine 1000 receives another segment. If the symbol is identifiable, the "yes" branch is followed from Step 1020 to Step 1022. In Step 1022, Separate Symbol Sampling Routine 1000 retrieves the fonted symbol.

Step 1022 is followed by Step 1024, in which Separate Symbol Sampling Routine 1000 stores the symbol pixels relative to the center position in Bitmap Frame RAM 140. Step 1024 is followed by the "End" step.

In a parallel process, Step 1004 is also followed by Step 1030. In Step 1030, Separate Symbol Sampling Routine 1000 receives an estimate of the symbol's center position.

Step 1030 is followed by parallel Steps 1032*a-b*. The reader will note that the parallel processes are nearly identical with the exception of the vertical and horizontal positions of the symbol being analyzed.

In Step 1032*a*, Separate Symbol Sampling Routine 1000 retrieves previous vertical values for the estimated center position. Step 1032*a* is followed by Step 1034*a*, in which Separate Symbol Sampling Routine 1000 determines if the estimated vertical position or a nearby position previously held a symbol. Step 1034*a* is followed by Step 1036*a* in which Separate Symbol Sampling Routine 1000 determines the actual vertical position of the symbol. Step 1036*a* is followed by Step 1024 and Step 1038*a*. In Step 1038*a*, Separate Symbol Sampling Routine 1000 updates the vertical position data. Step 1038*a* is followed by Step 1040*a*, which stores the vertical position data in Vertical Symbol Position RAM 620. In Step 1024, Separate Symbol Sampling Routine 1000 sores the symbol pixels relative to the vertical position in display memory. Step 1024 is followed by the "End" Step.

In parallel to Step 1032*a*, is Step 1032*b*, in which Separate Symbol Sampling Routine 1000 retrieves previous horizontal values for the estimated center position. Step 1032*b* is followed by Step 1034*b*, in which Separate Symbol Sampling Routine 1000 determines if the estimated horizontal position or a nearby position previously held a symbol. Step 1034*b* is followed by Step 1036*b* in which Separate Symbol Sampling Routine 1000 determines the actual horizontal position of the symbol. Step 1036*b* is followed by Step 1024 and Step 1038*b*. In Step 1038*b*, Separate Symbol Sampling Routine 1000 updates the horizontal position data. Step 1038*b* is followed by Step 1040*b*, which stores the horizontal position data in Horizontal Symbol Position RAM 620. In Step 1024, Separate Symbol Sampling Routine 1000 sores the symbol pixels relative to the horizontal position in display memory. Step 1024 is followed by the "End" Step.

In an alternative embodiment, Multi-Frame Sampling Controller 616 can be used with various imaging techniques. Once possible example would be for a raster video source where the pixel intensity signal contains a lot of noise. The multi-frame sampling technique could be applied to reduce the frame-to-frame noise. Another possible use could be for converting a positionally unstable/shaky camera image for display on an LCD.

In view of the foregoing, it will be appreciated that present invention provides a video converter and method of displaying desired display representations. While the invention has been disclosed in preferred forms for illustration purposes, those skilled in the art will readily recognize that many modifications, additions, and deletions can be made therein without departing from the spirit and scope of the invention as set forth in the following claims.

The invention claimed is:

1. A method of displaying a desired display element on a display over the course of at least several refresh cycles of the display in a manner to diminish unwanted wiggling of the display element, the method comprising the steps of:

determining a first display position for the display element;

displaying the display element on the display at the first display position;

determining a subsequent display position for the display element;

comparing the subsequent display position with the first display position;

maintaining the display element at the first display position if the subsequent display position differs from the first display position by less than a threshold amount; and gradually changing the illumination or darkening of a pixel or pixels defining the display element if the subsequent display position differs from the first display position by more than a threshold amount, in order that the display element moves to the subsequent display position as the pixel or pixels expire the first display position while the display element ultimately reaches full illumination at the subsequent display position.

2. The method as claimed in claim 1 wherein the step of gradually changing further comprises setting the display element at the first display position to a sample value that is an average of a last sample value and a current sample value.

3. A method as claimed in claim 1 wherein the step of gradually changing further comprises setting the display element at the first display position to a maximum value of the last sample value and the current sample value.

4. A method as claimed in claim 1 further comprising the following step:

decoding an incoming signal to uniquely identify the display element.

5. A method of displaying a desired display element on a display over the course of at least several refresh cycles of the display in a manner to diminish unwanted wiggling of the display element, the method comprising the steps of:

partially decoding an incoming signal to uniquely identify a symbol;

retrieving a fonted representation of the symbol from a storage device;

displaying the fonted representation as the display element;

determining a first display position for the display element;

displaying the display element on the display at the first display position;

maintaining the display element at the first display position if the subsequent display position differs from the first display position by less than a threshold amount; and gradually changing the illumination or darkening of a pixel or pixels defining the display element if the subsequent display position differs from the first display position by more than a threshold amount, in order that the display element moves to the subsequent display position as the pixel or pixels expire the first display position while the display element ultimately reaches full illumination at the subsequent display position.

6. A system for use with a display to diminish unwanted visual wiggling when displaying display elements in response to receiving a plurality of signals over a plurality of refresh cycles, the system comprising:

an input device for generating digitized signals in response to processing the incoming signals;

a controller positioned to receive the digitized signals, the controller operative for determining first and second display positions associated with locations on the display for some of the digitized signals and confining some of the display signals to the first display position if the first and second position differ less than a select amount, the controller generating updated signals, and gradually changing the illumination or darkening of a pixel or pixels defining the display element if the subsequent display position differs from the first display position by more than a threshold amount, in order that the display element moves to the subsequent display position as the pixel or pixels expire the first display position while the display element ultimately reaches full illumination at the subsequent display position; and an output device coupled to the controller and operative for transmitting the updated signals as display elements to the display.

* * * * *